(12) United States Patent
Sniedzins

(10) Patent No.: US 8,602,793 B1
(45) Date of Patent: Dec. 10, 2013

(54) REAL TIME LEARNING AND SELF IMPROVEMENT EDUCATIONAL SYSTEM AND METHOD

(76) Inventor: Erwin Ernest Sniedzins, Toronto (CA)

( * ) Notice: Subject to any disclaimer, the term of this patent is extended or adjusted under 35 U.S.C. 154(b) by 0 days.

(21) Appl. No.: 13/183,945

(22) Filed: Jul. 15, 2011

Related U.S. Application Data

(63) Continuation-in-part of application No. 11/824,871, filed on Jul. 5, 2007, now abandoned.

(60) Provisional application No. 60/807,028, filed on Jul. 11, 2006.

(51) Int. Cl.
*G09B 3/00* (2006.01)

(52) U.S. Cl.
USPC .............................. 434/322; 434/323; 434/350

(58) Field of Classification Search
USPC ........................... 434/322, 323, 335, 350, 362
See application file for complete search history.

(56) References Cited

U.S. PATENT DOCUMENTS

| | | | |
|---|---|---|---|
| 6,212,358 B1 * | 4/2001 | Ho et al. ........................ | 434/362 |
| 6,622,003 B1 * | 9/2003 | Denious et al. ................ | 434/350 |
| 2002/0049634 A1 * | 4/2002 | Longinotti ...................... | 705/14 |
| 2002/0087560 A1 * | 7/2002 | Bardwell ....................... | 707/100 |
| 2002/0188583 A1 * | 12/2002 | Rukavina et al. ............... | 706/45 |
| 2003/0163784 A1 * | 8/2003 | Daniel et al. ................... | 715/514 |
| 2004/0024776 A1 * | 2/2004 | Moore et al. ................... | 707/102 |
| 2004/0110119 A1 * | 6/2004 | Riconda et al. ................ | 434/350 |
| 2004/0161734 A1 * | 8/2004 | Knutson ......................... | 434/335 |
| 2006/0136409 A1 * | 6/2006 | Leidig ............................. | 707/4 |
| 2007/0111182 A1 * | 5/2007 | Outlaw et al. .................. | 434/350 |
| 2007/0179776 A1 * | 8/2007 | Segond et al. .................... | 704/9 |

* cited by examiner

*Primary Examiner* — Bruk Gebremichael

(57) ABSTRACT

The real time learning system and method provides a self learning environment to learn language or subjects faster and easier using textual content obtained in real time. The system is a computer-aided and management educational system that includes a real-time content processing module, a learning management Module, a content management database, an exercise generator module with Dictionaries, Picture Media, Music Libraries, Life Management and a User block. The system transforms any Real Time textual information into learning content and implements user learning exercises. Learning exercises are automatically created as multiple choice tests, filling blanks, quizzes, puzzles, crosswords, etc. from this learning content in real-time, based on a teacher or student online request for information. Linguistic text processing, keyword extraction and semantic procedures allow extraction of text information with a different data set to generate more intellectual exercises as comprehension tests, writing and grammar exercises. Different learning technologies are used to generate exercise implementation as visual mnemonics for remembering (Syntality[1]), interactive templates, games, multi-sensor activities. A Life Management module includes a Personal Action Success Strategy (PASS) System that contains Time Management, Motivation and Goal Setting Systems.

8 Claims, 17 Drawing Sheets

REAL TIME LEARNING AND SELF IMPROVEMENT EDUCATIONAL SYSTEM AND METHOD

RELATED APPLICATIONS

This application is a continuation-in-part of U.S. application Ser. No. 11/824,871 filed Jul. 5, 2007, which is incorporated herein by reference. This application claims the benefit of U.S. Provisional Application No. 60/807,028, filed on Jul. 11, 2006, which is incorporated herein by reference.

TECHNICAL FIELD

Embodiments relate to systems and methods for education, self-learning and self improvement. In particular, embodiments involve real time learning and self improvement educational system and methods

BACKGROUND

The School of Information Management and Systems at the University of California at Berkeley concluded that the world generates up to two (2) exabytes[13] of information per year and that, "This world's total yearly production of information amounts to about 250 megabytes for each man, woman, and child on earth. It is clear that we are all drowning in a sea of information. The challenge is to learn to swim in that sea rather than drown in it. Better understanding and better tools are desperately needed if we are to take full advantage of the ever-increasing supply of information."

An individual's enjoyment of and success in life is to a large extent determined by his or her skills and knowledge to handle and learn the information that is presented to them each day. A person's skill set and knowledge base are often viewed as assets of great value and importance to learn new information. The time an individual spends on self improvement and education in his or her lifetime is ever increasing. To this end many people continually search for new and more efficient ways of adding to their skill set and knowledge base. In addition, a person's ability to effectively improve his or herself, through for example, adding to his or her skill set or knowledge base, in part, determines that person's level of confidence and disposition.

An individual's skills and knowledge influence the ability of that person to succeed in school, to practice a career of his or her choice, to succeed in the practice of a given career and his or her ability to switch careers as he or she desires. Modern economies are to a large extent based on skills and knowledge and therefore it is not surprising that an individual's success is, in part, determined by the set of skills and knowledge that the individual can offer to a potential employer or client. Thus, in hopes of achieving financial success and the enjoyment of one's career, people often expend large amounts of energy and money on improving their knowledge base and skills set.

In addition, a person's skills set and knowledge base influence that person's ability to enjoy life in general. For example, these assets can influence a person's ability to travel and live in different countries, to communicate with people of various backgrounds, to enjoy art and literature from various parts of the world and to simply understand the world around them.

Thus, a person's skill set and knowledge base, as well as his or her ability to add to these two assets, impact on his or her life in many ways. This includes but is not limited to his or her financial success, confidence, and enjoyment of life in general.

With the emergence of the Internet and digital media, there is a wealth of knowledge and information available to a great number of people who have access to a computing device. However, the information available on the Internet is often dispersed over many web sites. Similarly, the information on digital media may be dispersed over a great number of files. Furthermore, the sheer amount of new information available, about 250 Megabytes per year, may be so daunting as to discourage individuals from attempting to learn it and turn it into their own skills or knowledge. Moreover, even if an individual locates relevant information, organizes it, and is determined to learn it, he or she may still have difficulty learning or applying it in an effective manner.

Thus, there is a need for a system and method that can efficiently and effectively aid individuals in reducing the amount of information presented, educating and improving themselves through learning information that they can turn into skills and knowledge faster and easier than traditional (passive) methods.

THE PRIOR ART

One element of the prior art is shown in US published pending patent application 2004/0153509 to Alcorn (the Alcorn reference).

It is submitted that the Alcorn reference simply discloses an interactive computer system which allows for user based selective access to pre-defined course materials. As such it is submitted that the Alcorn reference has nothing whatsoever to do with the subject matter of the present invention as disclosed. It is acknowledged that in every complex system a user-based access structure to previously prepared materials is commonplace.

The system of the present invention seeks out its raw material primarily from textual subject matter provided or obtained on line which is then processed by the operation of the system of the present invention. This is referred to as unstructured content. Only optionally does the system of the present invention seek out structured or pre-prepared content for combination with the unstructured content.

The following extracts from the Alcorn reference are noted.

Alcorn

[0002] The present invention relates generally to systems and methods for the exchange of information between instructors and students in an educational context. More specifically, the present invention relates to systems and methods in which an educational instructor interacts with one or more non-collocated students by transmitting course lectures, textbooks, literature, and other course materials, receiving student questions and input, and conducting participatory class discussions using an electronic network . . . .

[0003] In addition, the present invention relates to systems and methods that may be used by system users at various levels for the distribution and use of information over a network . . . .

[0023] Therefore, it is a general object of the present invention to provide a system and methods that allow users to interact with a computer network-based education support system through means of a simplified, easy-to-use user interface.

[0027] A further object of the invention is to provide a system that allows multiple types of users to access the features of the system as a function of their predefined role within the framework of the system, such as, a student, a teacher, or an administrator.

[0028] It is a further object of the invention to provide such a system that integrates with the education platform so that there will be provided therein value added services and control such as calendar, task, contact and communication functions.

[0030] An even still further object of the present invention is to provide a system and method that is accessible according to the access level of the system user.

SUMMARY OF THE INVENTION

[0037] In accordance with these and other objects, provided is a system for providing to a community of users access to a plurality of on-line courses, comprising a plurality of user computers and a server computer in communication with each of the user computers over a network that includes LANs, MANs, WANs, the Internet, intranet, and/or the WWW. Each user computer is associated with a user of the system having predefined characteristics indicative of a predetermined access level to the system. Each level of access to data files is associated with a course, and a level of control over data files associated with a course. The preferred server computer is capable of storing data files associated with a course assigning a level of access to each file, determining an access level of a user requesting access to a file, and allowing access to a file associated with a course as a function of the access level of the user. Accordingly, the level of access preferably is associated with the ability of a user to access the file.

[0040] ... Also, the user may be provided with an access level to enable creation of a student file associated with a file for which the student user is able to read. The file that the student is able to read may be an assessment file created by the instructor user, and the student file created by the student user is a response to the assessment file. The assessment file may be a plurality of examination questions selected by the instructor user to assess the learning level of the student user. The examination questions may be selected by the instructor user from a predetermined pool of available examination questions. The examination questions also may be created by the instructor user substantially at the time of the creation of the assessment file and optionally added to the pool. The student file may be reviewed by the instructor user and assigned a grade, which would be made available on-line to the student user. The instructor user may collate the grades obtained from reviewing a number of student files, and the collated grades may be made available on-line to all student users associated with the course.

[0042] A user may be required to enter a logon sequence into a user computer in order to be provided with access to course files associated with that user. The user is then provided with access to all courses with which the he/she is associated after entry of the logon sequence. The user is provided with a web page that may include a plurality of course hyperlinks. These course hyperlinks preferably will be associated with each course that the user has been enrolled either as an instructor or as a student. Selection of a course hyperlink will provide the user with a web page associated with the selected course. This web page will have content hyperlinks and buttons to various content areas associated with the course. The content hyperlinks and/or buttons may include, for example, an announcement area hyperlink, a course information hyperlink, a staff information hyperlink, a course documents hyperlink, an assignments hyperlink, a communications hyperlink, and a student tools hyperlink.

[0045] The present invention also includes a method for providing on-line education that further may include the steps of establishing a course to be offered on-line, offering the course to be taken on-line to a group of student users, and providing access over the network to the course files to student users who have enrolled in the course. The establishment of the course includes an instructor user generating a set of course files for use in teaching the course, then transferring the course files to a server computer for storage. The stored files will be accessible by a predefined community of student users having access to the server computer over a network. (emphasis added)

Another element of the prior art is shown in US published pending patent application 2007/0026375, the Dewey reference. This reference shows a different approach from Alcorn whereby an student electronic workbook is generated programatically. Variability is introduced by the generation of student materials on demand by the use of "standardized web page templates and obtains its content from a relational database of reusable web page components comprising multimedia study materials and practise exercises for alt students" {para 0013}. Thus, the Dewey system seeks 189 to adapt a common library of pre-prepared study materials and tests to individual users by introducing a layer of web page templates as a basis for "variability" which the present applicant would call user-customization.

The following extracts from the Dewey reference are noted.

Data components are stored in a server-side data storage and retrieval means of a type widely known in the art. The data storage and retrieval means in the depicted embodiment includes a multi-media bi-lingual dictionary (68), a glossary of English language grammar terms and their definitions (66), a library of graphical images (74), a library of playable sounds (76), a library of electronic books and stories for reading practice (70), a library of educational games and puzzles for reinforcement of subject matter (80), a library of reusable workbook web page templates (72), a library of client-side scripts for web page interactivity (78), and a record of current and completed study and practice assignments (56) with each record cross-referenced to its corresponding web page template (72).

[0033] ... and a server-side script processing method (28) that interprets and executes programmatic instructions encoded in certain files stored in the data storage and retrieval means (22) and generates web pages formatted with Hypertext Markup Language (HTML) for the web page server method (26), which web pages also contain embedded client-side scripts for execution in the client-side student computer (10) when the web page is delivered.

The student may click on an electronic glossary of grammar terms menu item to look up a term in the electronic grammar (66). The student may type in the term to be looked up using a keyboard, or the student my select the desired term from on-screen text by using a pointing and selecting device. The invention will retrieve and display the desired term and its definition, and an example of correct usage from the data storage and retrieval means.

As can be seen the focus of the Dewey system is the processing of pre-organized course materials organized into libraries and resources both server-side and client-side so as to adapt to each individual student so as to provide immediate access by choice, thus alleged "variability".

Nothing in Dewey even suggests its application to the online system of the present invention which processes input textual data from any source in such a way that exercises and other functions can be programmatically generated in huge numbers depending upon the amount of input textual data (ie indefinite), presented to the user and carried out on line, all in real time, with or without optional structured course materials.

The prior art statement in Dewey assists in this matter since it points out those advances made by Dewey and described, as noted below:

[0011] U.S. Pat. No. 6,793,129 by Wood, et al. (2004) discloses an electronic portable study aid apparatus with the ability to download instructional materials from a server. However, the Wood patent is not a complete and comprehensive study aid and practice aid, since it is missing coordinated collateral reference materials. The Wood patent makes no provision for retained data storage of student inputs and makes no provision for the automated generation and assembly of the downloadable materials.

[0012] U.S. Pat. No. 6,146,148 by Stuppy (2000) discloses a method for generating and delivering an electronic student workbook. The present invention is an improvement on the Stuppy patent. The electronic student workbook disclosed in the Stuppy patent is structured as a teaching aid and contains lesson teaching material and testing exercises for a student to perform. A teacher oversees the delivery of teaching material and oversees student responses to testing exercises. The present invention is an improvement because it is structured as a self-help study aid and practice aid and contains self-help lesson review material and practice exercises for a student to perform without the aid of a teacher or tutor. A programmatic method oversees the delivery of study material and oversees student responses to practice exercises.

[0013] The electronic student workbook disclosed in the Stuppy patent is generated by selecting materials from a library of pre-authored teaching lesson materials and testing exercise materials, according to a profile of student skill gaps. The electronic workbook in the present invention is an improvement because it is generated programmatically from standardized web page templates and obtains its content from a relational database of reusable web page components comprising multi-media study materials and practice exercises suitable for all students.

[0015] The present invention is a further improvement because it integrates the content and use of electronic student workbook pages with the content and use of various online collateral study-aid and practice-aid reference materials which all draw their content from a common database—to assure that such contents are always fresh and always consistent.

[0016] U.S. Pat. Nos. 6,592,379 and 6,666,687 and 6,733,295 and 6,749,434 by Stuppy disclose continued improvements in the basic design first disclosed in the '148 patent. They do not, however, depart from the core principle of a teacher-student interaction and workbook containing teaching and testing materials based on a student skill profile. The present disclosed invention does not require or include a teacher. The present invention delivers standardized and graduated self-study and practice materials, not skill-gap specific teaching and testing materials.

[0017] U.S. Pat. No. 6,898,411 by Ziv-el, et al. discloses a method and system for online teaching using teachers, teacher computers, student computers, and web page based electronic workbooks in which web pages are retrieved according to their uniform resource locators (URL). The present invention is an improvement because the web pages in the present invention are generated on-demand and are not pre-stored and retrieved according to static URLs.

The Dewey disclosure speaks of on-demand generation but it should be noted that what is being done is the use of web-page formats to deliver standardized and graduated self-study and practise materials to the student as the course continues.

Nowhere in Dewey is there any suggestion that raw and unstructured textual data might be engaged in real time by an educational system, the subject of the present invention.

Paragraphs 0029 and 0061 of the Dewey reference storage and retrieval. These paragraphs are set out here for convenience.

[0029] Data components are stored in a server-side data storage and retrieval means of a type widely known in the art. The data storage and retrieval means in the depicted embodiment includes a multi-media bi-lingual dictionary (68), a glossary of English language grammar terms and their definitions (66), a library of graphical images (74), a library of playable sounds (76), a library of electronic books and stories for reading practice (70), a library of educational games and puzzles for reinforcement of subject matter (80), a library of reusable workbook web page templates (72), a library of client-side scripts for web page interactivity (78), and a record of current and completed study and practice assignments (56) with each record cross-referenced to its corresponding web page template (72).

[0061] The student may click on an electronic dictionary menu item to look up a word in the electronic dictionary (68). The student may type in the word to be looked up using a keyboard, or the student my select the desired word from on-screen text by using a pointing and selecting device. The invention will retrieve and display the desired word and its definition, an example of correct usage, the correct part of speech, an illustration of the word when such an illustration exists in the data storage and retrieval means, and a translation of the word into another language when such a translation exists in the data storage and retrieval means. (emphasis added)

Dewey provides nothing more than user access to electronic dictionaries on request in the manner of a variety of prepared comparative sources of information such as illustrations, examples and translations.

In the present invention the user is provided with a wide variety of presentations at the subject matter level to both unstructured and optional structured information inter-related with user learning level, results and life style choices. This is an entirely different user experience as the present invention seeks to educate based upon broad meaning derived by the system from textual input.

The prior art focuses entirely upon prepared materials (herein referred to as 'structured' materials), often referred to as course materials, solely, and then seeks to adapt to the student user on an ongoing basis. This approach is limited to the pre-prepared structured materials, thus limiting the results available.

Another element of the prior art is shown in US published pending patent application 2005/0227216 to Gupta (the Gupta reference). In the Gupta reference the disclosed invention is described as a distributed management system for pre-configured data. Variability is provided by the user's choice of logic functions and devices at hand. The Gupta reference provides as follows:

[0022] A system is provided for managing academic and social life for students and includes a central server connected to a wide-area network and storing a repertoire of logic functions for use by students in managing academic activities, and a plurality of computerized appliances associated with individual students, the computerized appliances connectable to the wide-area network. In one embodiment, students may download logic from the central server, and execute the logic to configure and manage activities related to classes and studies in a college or university, and may interact with other students through the central server.

[0023] In a preferred embodiment, the wide-area network is the Internet network. In one embodiment, the computerized appliances associated with individual students connect to the wide-area network through a wireless system. Also in one embodiment, the central server includes a suite of logic functions for teachers to interact with the central server and student users.

[0024] In a preferred embodiment the system enables integrating and managing academic and social activities from a single point of control and further includes, in one embodiment, one or more distributed servers connected to the wide-area-network, the servers adapted for network-based academic learning and for communication with the central server over the network; one or more content servers connected to the wide-area-network, the content servers adapted to provide Web-based content and services and adapted for communication with the central server; and one or more instances of software distributed to network-capable computing devices, the software instances adapted for managing aspects of academic and social activities in conjunction with the main server for the operators of the computing devices.

[0026] In one embodiment, the instances of software are student interfaces and the operators are students. In another embodiment, the instances of software are faculty interfaces and the operators are members of a faculty. In a preferred embodiment, the instances of software are a mix of student and faculty interfaces and the operators are a mix of students and faculty.

[0027] In one embodiment, the at least one server adapter includes software for interfacing, for data migration, for data abstraction, and for XML data generation. In this embodiment, the central server further includes software for generating application templates, for building applications, and for integrating third-party content into end-user display data.

[0028] In a preferred embodiment, the network-capable computing devices are one or a combination of laptop computers, desktop computers, cellular telephones, and personal digital assistants. Also in a preferred embodiment, the central server further includes data storage volumes personalized and allocated for use by the server and by the operators of the computing devices.

[0029] According to another aspect of the present invention, a graphics user interface is provided for controlling and for managing aspects of academic and social interaction of the interface operator. The interface includes a registration and configuration component for enabling registration and configuration of the interface to receive data from and to enable interaction with a central server; a networking component for enabling navigation on a data network; a messaging component for receiving and sending message content over the network; a processing component for enabling document generation, data manipulation, and mathematical calculations based on rule; and a file sharing component for enabling data sharing between interface operators according to file permissions and rules.

[0035] In a preferred embodiment, the processing component includes a utility for taking class notes. In a preferred aspect of this embodiment, the utility further includes automatic file naming and archiving capabilities related to course description. In one embodiment, the file-sharing component is integrated with the messaging component. In this embodiment, the file-sharing component includes sharing of calendar data according to file permissions.

Also cited are US published pending patent applications 2007/0166684 published 2007 07/19 USPPA to Walker and 2003/0068604 published 2003 04/10 to Krasney. Neither of these references add to prior art as described above.

The prior art describes a need for a substantial range of student learning exercises of a wide variety in type, content and number. These are implemented to teach new material, support and assess the student's interactions with the learning process. Expensive and time consuming teacher involvement is to be avoided. Unfortunately, with all prior art systems variability is provided by choices from fixed material arranged beforehand, herein referred to as structured content and not generated in real time. This highly limits the number of choices any such system can present as well as the structured material being presented. For example, authoring tools are disclosed in patents U.S. Pat. No. 6,018,617, U.S. Pat. No. 6,704,741, U.S. Pat. No. 6,259,890, and others. In other examples, a computer-based test is generated from a database of exercises created through other means (e.g., an authoring tool or automatic means). Such computer-based testing systems are disclosed in GB237362B, U.S. Pat. No. 5,565,316, US2004234936A, and others. In still other examples exercises are sought to be created completely automatically. Automatic generation for structured content in respect of textual material are reported as described by Brown et al. (Automatic Question Generation for Vocabulary Assessment, Proc. of the Conf. on Human Language Technology, 2005), Mostow et al. (Using Automated Questions to Assess Reading Comprehension, Cognition and Learning Vol. 2, 2004), Coniam (A Preliminary Inquiry Into Using Corpus Word Frequency Data in the Automatic Generation of English Language Cloze Tests, CALICO Journal Vol. 14 Nos. 2-4, 1997), Aist (Towards Automatic Glossarization, Int. J. of Artificial Intelligence in Education Vol. 12, 2001), Hoshino and Nakagawa (A Real-Time Multiple-Choice Generation for Language Testing, Proc. of the 2nd workshop on Building Educational Applications using NLP, 2005), Sumita et al. (Measuring Non-Native Speakers' Proficiency of English Using a Test with Automatically-Generated Fill-In-The-Blank Questions, Proc. of the 2nd Workshop on Building Educational Applications using NLP, 2005), Mitkov and Ha (Computer-Aided Generation of Multiple-Choice Tests, Proc. of the Workshop on Building Educational Applications using NLP, 2003), and in inventions as disclosed in U.S. Pat. No. 6,341,959, in Japanese 26,126, 242 A, in Japanese 27,094,055 A2). These methods focus on a target word or concept as input and then use a two step process each depending on the type of exercise required. Examples are multiple-choice exercises, fill-in-the-blank questions and comprehension exercises generated by selecting a sentence from the reading text that contains the target word or concept and restructuring the sentence into a question.

Such exercises are valuable for learning and student interactions but are based upon the selected textual material itself and then work complex algorithms to produce suitable exercises. Difficulty levels are adjusted by changing parameters. In Nagy et al. (Learning Words From Context, Reading Research Quarterly Vol. 20, 1985) difficulty is adjusted by varying the closeness of the distractors to the correct answer on several levels. In Mostow et al. (Using Automated Questions to Assess Reading Comprehension, Cognition and Learning Vol. 2, 2004), and in Aist (Towards Automatic Glossarization, Int. J. of Artificial Intelligence in Education Vol. 12, 2001), for example, use is made of varying the familiarity of the distractors and varying the difficulty of the question stem. These do not control the level of difficulty depending on the ability of any particular student as exercises either have a predetermined level of difficulty, or worse an unpredictable level depending on a random selection. That is, no method uses any model of the user's current knowledge other than individual manual control in personalized exercises.

One reported method for controlling the difficulty is shown in Computer Adaptive Testing (CAT) (Wainer et al., Computerized adaptive testing: A primer, Hillsdale, N.J.: Lawrence Erlbaum Associates, 1990; van der Linden Et Hambleton (eds.), Handbook of Modern Item Response Theory, London: Springer Verlag, 1997). In CAT, a test item is selected for a particular student using a statistical method to personalize the test to individual students; however, test items must be generated beforehand and calibrated by trialing each one on many real students, not created on demand.

Further, systems and methods have been developed to seek out the content of textual materials in the form of individual extractors and parsers such as are referred to, for instance, in In order to maintain learning success without boredom or excessive guessing the system must be interactive on a real time basis and directly related to the individual students request for specific learning content and to that students actual ability scores and test summaries.

In the past efforts to improve information value without data overload have resulted in parsers and extractors of various types being used, such as, for example as described in United States Patent Application 2003/0130837 to Batchilo et al., Jul. 10, 2003, and in U.S. Pat. No. 5,774,845 to Ando, et al., Jun. 30, 1998 for an Information extraction processor, and the prior art items cited in each of these documents. Purportedly, keyword and structural analysis are used to improve performance and enhance summaries of text information.

For example, in a textual string of 2000-4000 characters it is expected that there will be about 1-750 unique words, namely about –50% from all words. Each of these words can have synonyms, antonyms, parts, part of, types, type of, relatives and the like adding about 1-100 additional words. Such a grouping would be expected to have about 1-50 sentences (sentN) with about 1-24 tenses, 1-10 word levels, 0-30 key words, 1-10 parts of speech. For each sentence it is expected from further linguistic analysis that there would be about 1-~3 subjects+predicates (Sub+predN), 0-~20 preposition phrases and about 0-8 Infinitives or gerunds. Other phrases presented by syntactic and semantic links would be expected to be about 1-~100. Thus, it can be seen that much meaning can be found and separately extracted from textual strings.

Given the high cost of educators and the variety of students and learning styles there has developed a growing need for automated learning systems and methods which improve the relevancy and transparency of learning with automated exercise generation as part of a learning system without the need for pre-prepared structured learning materials such as pre-prepared lessons and tests, whether they be complete units or assembled into a whole from individual completed parts created beforehand and stored for retrieval. Such automated learning systems are needed to be flexible to both the user, the user environment such as user history and the presence of any learning institution along with the subject of interest.

Structured materials are known to seek to present useful information taken by educators from the huge base of textual data which is available on any subject of interest in a fashion which can be relatively simply understood at a learning level and learned.

Prior art systems have failed to produce flexible learning systems which operate automatically without the need for pre-prepared (structured) materials and provide the high degree of variability necessary to maintain and advance the learning process of a variety of different users and types of users using unstructured material.

OBJECTS OF THE INVENTION

It is an object of the invention to provide an automated learning system by which the user may select a subject area of interest, as by a search or learning request, and be presented with a wide variety of options for learning, measuring advancement and testing.

It is an object of the invention to provide an automated learning system which processes input textual material to extract elements of meaning by parsers and extractors and formulates a data structure including the textual material and links identifying the extracted elements.

It is a further object of the invention in response to a learning request to process the data structure against updating user information so as to identify the user level and goals against the data structure and present the user with a variety of selected automatically generated exercises and tests optionally obtained from parametrical models of functionality for a variety of types of exercises and tests.

It is a still further object of the invention to adapt and update said user information based upon user learning performance in the system.

It is yet a further object of the invention to provide a learning system with an essentially unlimited number and variety of learning exercises and tests from even small amounts of unstructured materials.

SUMMARY OF THE INVENTION

The invention provides a computer-implemented system, apparatus and a computer program for generating learning exercises and providing an improved learning method operating in real time in respect of a input stream of textual material with a real time content processing block; including an input data module operable upon a user learning content request to search for real time content and adapted to separate textual parts of said real time content into an input data set, dictionaries of linguistic patterns comprising computer based rules for linguistic patterns analysis, a content processing module adapted to extract and maintain sets of linguistic identification links in said input data set based upon said dictionaries of linguistic patterns, and, combine said input data set and said linguistic identification links into a different data set, and means to communicate said different data set, a user life management block including a processing module for user data including user object data, user life management data, a user personal data set of user learned textual information, and, a return module to provide user information relevant to said user learning content request; a system management block providing communication between parts of the system including a learning management module operable upon a said user real time learning content request to retrieve said different data set and generate a request to said user life management block to return said relevant user information, combine said retrieved user information with said different data set, extract an unlearned data set, determine a user level, to provide an exercise response based upon either said different data set, said unlearned data set, said retrieved user information and said user level, an exercise generation block including an exercise generator module operating upon the exercise response, and one or more of a data set of dictionaries, a data set of picture dictionaries, a media library, a music library, a data set of exercise types and functions, and as means to generate and provide exercises in real time; with a graphics user interface module operable to automatically present textual content as an exercise and collect user responses.

BRIEF DESCRIPTION OF THE DRAWINGS

Embodiments are described in further detail below by way of example only, with reference to the accompanying drawings, in which.

DETAILED DESCRIPTION

Figure 1:
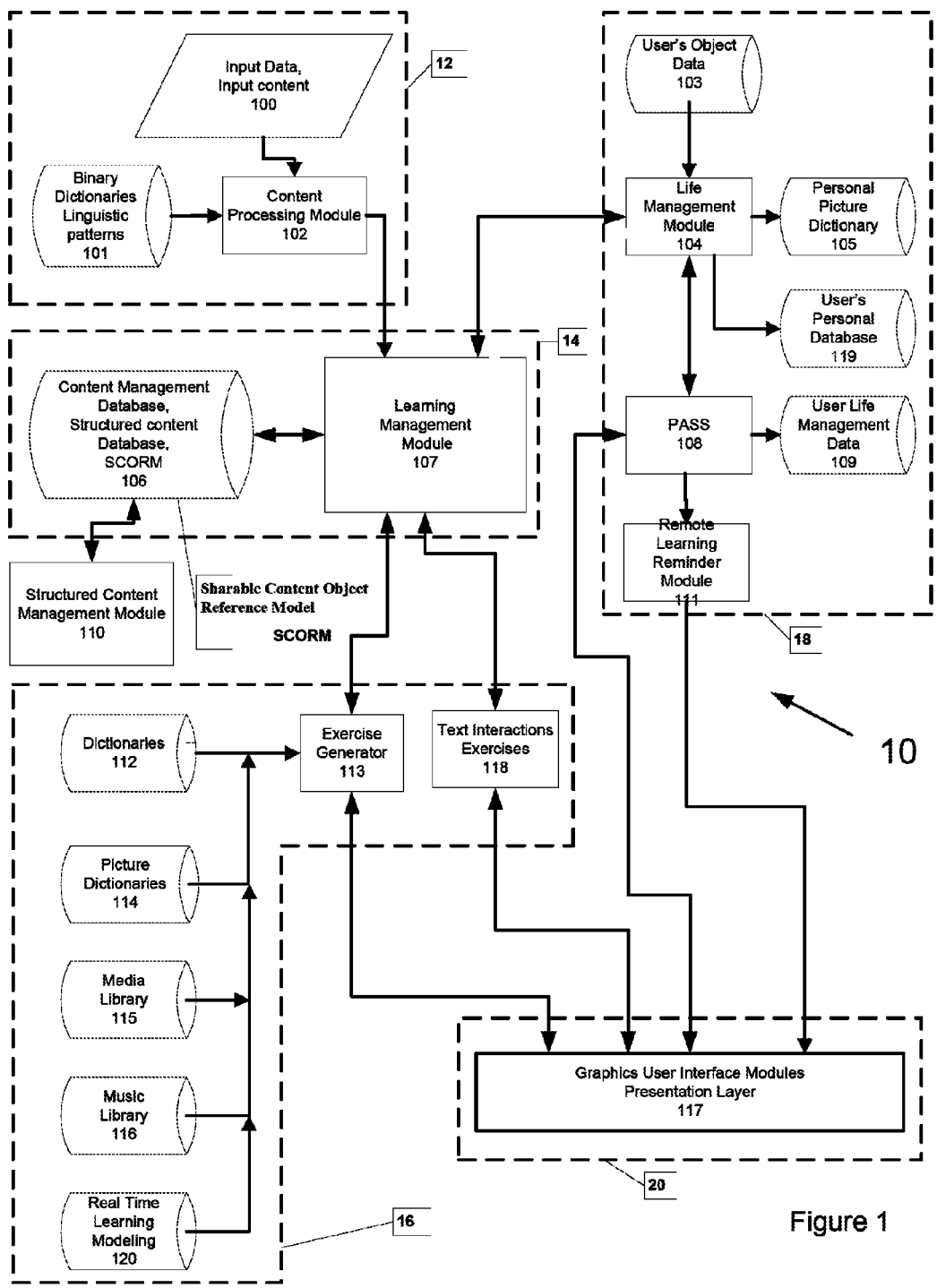
FIG. 1 is a block diagram of the Real Time Learning and Self Improvement Education System and Method, according to one embodiment; showing Dictionaries and Linguistic Patterns 101.

FIG. 1 illustrates an embodiment of a Real Time Learning (RTL) and Self Improvement Educational System [hereinafter "RTSL system" or "real time self-learning system"] 10. Real time self learning system 10 takes any textual information from any digitized document such as MS/HTML/XML and helps the user turn it into his or her knowledge in an efficient manner and may thereby assist a company to save or make money by creating documents, spreadsheets, etc. from the user's acquired knowledge. The system will automatically test the user on the textual information they want to learn and provide automatic feedback scores and marks on the interacted information they wanted to learn.

In one embodiment, real time self learning system 10 is a Computer Aided Total Educational Learning System (CA-TEL) that helps users to handle any data up to 30% or better faster and easier by providing:

a) summarization and evaluation of any textual INFORMATION presented in real time (RT) for fast and easy INPUT analysis.

b) internal PROCESSING and learning of this Real Time (RT) data presented through visual, mnemonic and phonic interactivities.

c) OUTPUT summarization and automatic tests that are created to evaluate the acquired level of knowledge from the same RT inputted data presented or interacted with.

d) continuous FEED BACK through scores and marks on the interactive output results from this same RT data for motivation and continuous knowledge improvement opportunities.

The total Real Time Self-Learning (RTSL) system 10 provides an online Learning process (please refer to Appendix 1: System Aspects for further details) with:

1. Internet searches for real time user's content;
2. Generating exercises & tests in real time along with structured teacher prepared lessons (structured content);
3. Effective Learning technologies utilizing visuals, mnemonics and phonics tools;
4. A control system via a user's Personal Action Success Strategy (PASS) module and a Life Management System.

Referring to FIG. 1, the RTSL system 10 comprises real time content processing block 12, Main Management System block 14, Exercise Generation block 16, Life Management and User block 18, and the Presentation block 20.

Real time content processing block 12 includes: Input Data, an Input Content Module (100), a Dictionary and Linguistic Patterns Database (101), a Content processing Module (102).

Content processing module (102) processes input data and extracts from its textual part, a different data set that provides text meaning, style, grammar, keywords and others links. The format of the content processing module output is XML.

Main Management System block 14 includes: a Learning Management Module (107), and a Content Management Database (106). Learning Management Module (107) is the main management module that links together the functionality of the system modules. In the Figures this linking is depicted arrow connections for processing flow in either direction to link together the module functionality. Structured Content Management Module (110) and Content Management Database (106) are responsible to deliver a collection of structured content to users and to allow teachers to create or edit existing structured content in content management database (106).

Structured Content Management Module 110 may interface with content resources from other systems. A format of import data is SCORM. Structured Content Management module 110 is the interface module between existing systems and the real time system of the invention. This module provides structured content data by importing them from another system.

Exercise Generation block 16 includes: Exercise Generator Module (113), Dictionaries (112), Picture Dictionaries (114), Media Library (115), Music Library (116), and Text and Visual images Interactions (118) and Real Time Learning (120). Exercise generator module (113) synthesizes the process of creation of exercises from any digitized text. Text Interaction Exercises module (118) represents content dependent and content independent activities including output Essay Writing (118.001). Presentation layer or Graphics user interface modules (117) deliver the learning process to the user for multi module implementation.

Life Management and User block 18 includes: User Object (103), Life Management Module (104), Personal Picture Dictionary (105), Personal Action Success Strategy (PASS) (108), Life Management Database (109), Remote Learning Reminder Module (111), and User's personal database (119). Life Management Module (104) ties together personal user information, user knowledge level, user goals and user life with textual content to be learned in real time or with structured content prepared by teachers. PASS (Personal Action Success Strategy) (108) module includes; a time management system, goal setting, performance monitoring and tracking. Remote Learning Reminder Module (111) supports PASS (108).

The Presentation block 20 includes the Graphics User Interface Modules (117).

Using the graphic user interface module (117) a user can select different learning opportunities from any textual content presented from any digital device or communication channel such as the Internet, LAN, CD-ROM, etc. Depending on the type of information that the user wants to learn in the learning process the system will:
1. provide online learning processes by searching for real time content and preparing the different data set;
2. provide learning processes by selection of a course or lessons prepared with structured content;
3. manipulate the user's data from user's life management database:
   To provide scheduled user content to the learning process,
   To continue to follow the personal scheduler to learn something,
   To create a personal learning scheduler by time management system from PASS,
   use a goal-setting system to create new goals or modify existing goals,
   use a motivation system,
   create plans or to see own achievements by score estimation system.

Real Time Content Learning Process

The real time content learning process begins from a user's wide world or local search of content to learn. It could be the User's favorite topic, any information from an Internet search, news, business information, fiction, letters, etc. Input data module (100) gets control and provides data input and primarily filtration and processing.

Content processing module (102) provides a transformation of any textual information to the data structures in a different data set that describe such text extracts as sentences, key words, linguistic structures, grammar structures, parts of speech, word characteristics, and language text level and others. Output from (102) is data in XML (content).

In this system all data structures are supported by a serialization mechanism and can be transformed into XML.

Learning Management Module (107) will process this different data setfrom (102) to create another XML package (content+user information) for the exercise generator module. The package contains information: real time content description and data from user database including coefficients that represents knowledge level of the user, their skills and achievements.

The exercise generator module (113) processes the XML package (content+user Info) from (107) and generates XML package (exercises) that describes list of exercises to learn real time user content. XML package (exercises) will be saved to the user's personal database (119). Life Management Module (104) is responsible for the management of a user's personal information and the calculation of the special parameters by the Personal Action Success Strategy (PASS) (108) technique parameters. These parameters are used to personalize the process of exercises in real time generated by the real time exercise generator module (113). The exercise generator module (113) uses collections of dictionaries, Graphics, Media and Music Libraries and Real Time Learning (120) to create exercises or tests from current information that the user wants or needs to learn.

Presentation layer (117) implements exercise descriptions in template approach by UI controls. A user can execute the generated exercises and the result will be saved by the life Management module (106) in the User's personal database (119).

Structured Content Learning Process

The structured content learning process opportunity begins from a user search in Content Management Database (106). The search can be provided by a subject, language level, grammar rules, skills needs (listening, pronunciation, speaking) or keywords. Learning Management Module (107) will process the search result, will create XML package with requested content and will transfer data to presentation layer (117).

User Life Management Control System (109)

The user life management control system starts to work after user registration process will be finished. User's Object Data Module (103) will include user personal membership information (name, age, address, phone number, sex, etc) and special personal information (birthday date, how many years user wants to live, wake up time, bedtime, etc.). After registration process each user will have possibilities to save information about their knowledge from the PASS placement test, describe their attitude for their life goals and achievements and other information.

All this information will be used by Life Management Module (104) and saved in User's life management database (109) and user's personal database (119). In addition, each user will have a Personal selected images or Pictures for associated words and Personal vocabulary dictionary builder (105).

When a user applies Life management control system, he can reach three main functions of PASS (108):

Time Management System (108.001);
Goal Setting System (108.002);
Performance Tracking System (108.003)

These functions allow the user to organize their life to provide effective learning or self-improving process. Remote Learning Reminder Module (111) helps to bring learning process to the multimodal environment.

Real Time Content Processing Block 12

Reference is made to FIG. 1. Real time content processing block 12 provides data input process and builds object structures to describe data extracted from the input stream. Content processing block 12 comprises: Input Data, Input Content Module (100), Dictionary and Linguistic Patterns database (101), and Content processing Module (102).

The learning content in this system may comprise any information that a student will use for a learning process. In real time in a web application the learning content can be gotten as a result of a "SEARCH" function. For example, it can be web page content. In case of a desktop application the learning content could be any textual information that is loaded inside the application by copy/paste operation or open file operation.

Figure 2:
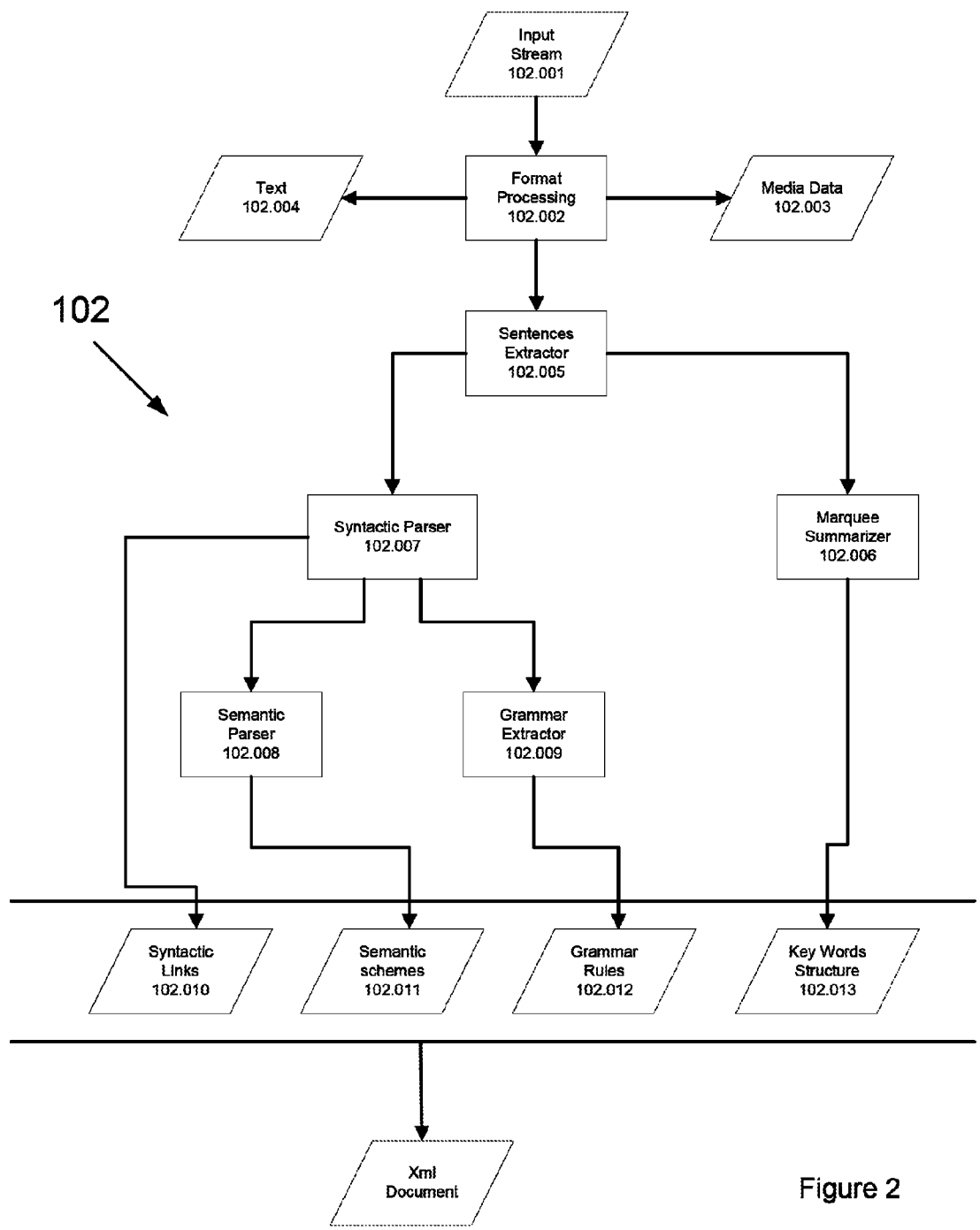
FIG. 2 is a block diagram of the content processing module of FIG. 1.

Reference is next made to FIG. 2, format processing module (102.002) gets the input stream as Unicode string and extracts tags (including HTML tags), special symbols, format symbols, short cuts, abbreviations etc. A result of processing module (102.002) contains two parts.

One of them represents a textual part of input and second one represents a media part of information. The textual part is data structure that describes input stream as string collection, where each string has a descriptor. The descriptor represents the string content. Here are some string examples:

ASCII symbols string: text string
HTML tags: <image src="picture.jpg">some text . . . </image>;
Abbreviation: U.S., P.M.
Short cuts: n., pl. adj. v.

Another part of the module result is a list of files that includes pictures, sound, video clips and other media content.

This embodiment of the different data set structure describes the textual learning content and is called the Content Description Structure (CDS).

The Sentences Extractor module (102.005) continues to process the textual part of inputted information. This module uses the original algorithm, based on token analyzing approach. The result will add data to the CDS as a descriptor, which contains a sentence number and marks for words that correspond to the first and last words in a sentence.

A Marquee Summarizer module (102.006) uses the CDS as a container for input and output data. The module puts more descriptors into the CDS to define some words and phrases in sentences as keywords or summarization items.

This module can use three embodiments that are implemented by:

An approach, which is simple and fast, that uses three parameters for keyword extracting;
An approach that is based on a 17 parameters model;
An approach, which uses semantic schemes to extract keywords and main text idea Syntactic Parser module (102.008) takes data from the CDS and processes it by sentences. Results for each sentence describe syntactic links between words in a sentence. A Descriptor with references to these syntactic schemes will be added to the CDS.

Input data to the Semantic Parser module (102.008) are the syntactic schemes for each sentence that were built by Syntactic Parser module (102.008). Output data is a semantic scheme that represents semantic links inside the text. A basic skeleton for the semantic scheme is built as extracting subjects, direct objects and predicates for each sentence in the text. The subjects and the direct objects are edges and the predicates are links between these edges. This graph can have loops, cycles and trailing edges.

More additionally graph dressed edges and links will be added by extracting indirect objects, gerund phrases, infinitive phrases, and others. A semantic description of the text presents by chains, that extracting from semantic graph by reasoning rules. In structure, the CDS will get descriptors that rules the Semantic Parser module (102.008) output.

A Grammar Extractor module (102.009) takes syntactic links and interprets them as grammar rules. Each grammar rule is presented as a combination of syntactic links and time description. This module processes each sentence separately and creates for each sentence descriptor to grammar rules.

Therefore, all modules, which contains Content Processing module (102), processes the text part of input stream to build schemes and creates descriptors in the CDS.

Final XML document contains descriptors for
Syntactic Links (102.010);
Semantic Schemes (102.011);
Grammar Rules (102,012);
Sentences description (102.013);
Keywords and Summarization (102.014);
Main System Management Block 14

Reference is again made to FIG. 1. Main System Management block 14 is used as a main control processor. It provides for communication between all parts of a system. It is the main management module that links together all system functional modules. Main System Management block 14 comprises Learning Management Module (107) and Content Management Database (106).

Main System Management module provides communications between: Content processing Module (102), Life Management Module (104), Exercise generator module (113), and Presentation block (117).

Figure 3:
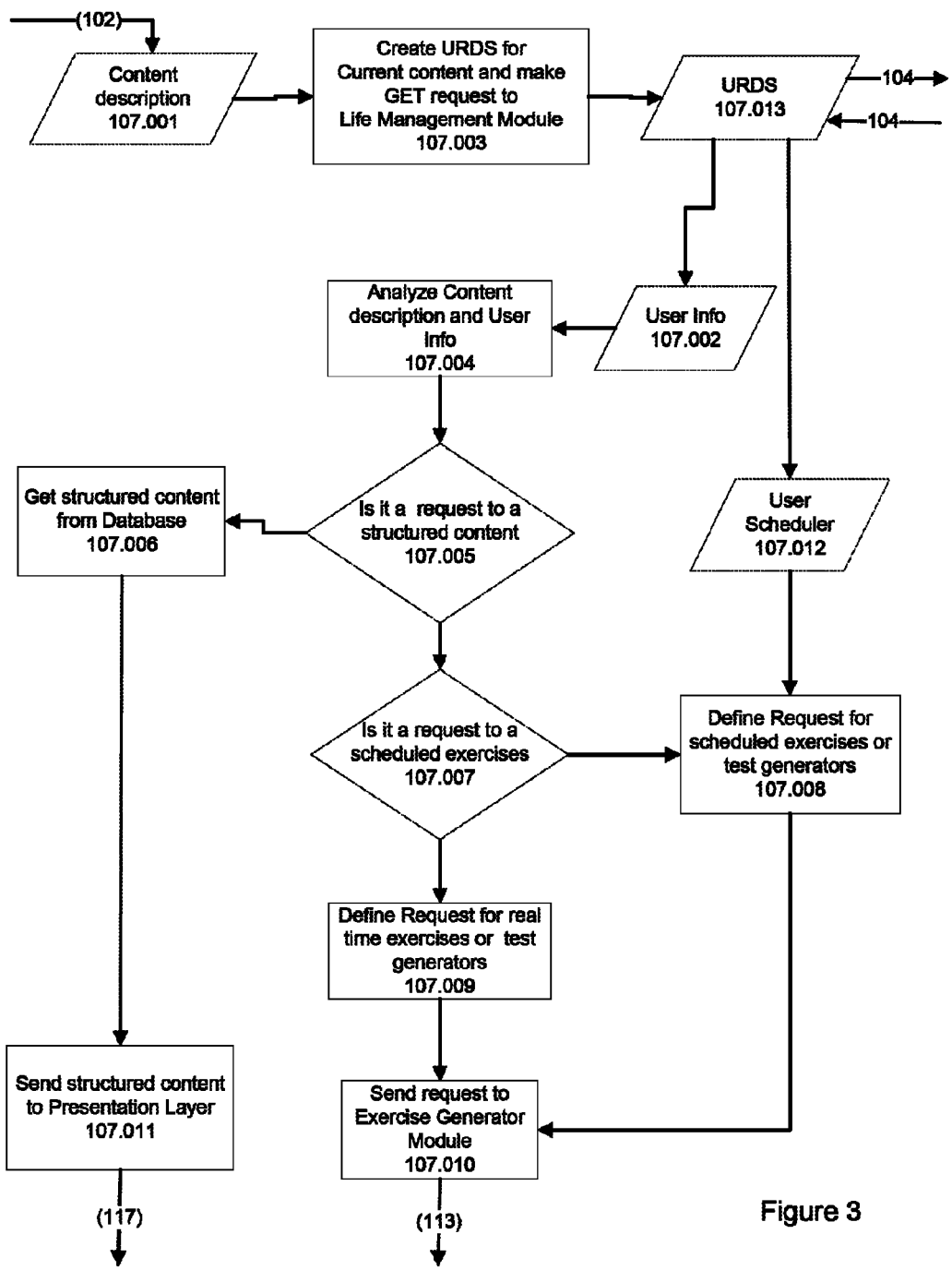
FIG. 3 is a flow chart illustrating the steps taken by the learning management module of FIG. 1.

Reference is now made to FIG. 3. Input data of Learning Management Module (107) includes two parts. First part is presented as Content Description (CD), (107.001). Second part is the User information (107.002) that was transferred from Life Management module (104). The Content description (107.001) is CDS structured. It contains descriptor for type of content. The learning content can include real time learning content, real time user scheduled learning content, structured learning content.

According to content type the Analyze Content Description module (107.003) creates a request to get a data structure, which we will call URDS—User Request Description Structure. It contains:

type of content
processing mode (edit, show, execute, print, . . . );
reference to content data as CDS. In the case of structured and scheduled content contains the descriptor for learning the content that user has choose;
reference to User Descriptor (UD), which represents user knowledge reflection for current content (unknown words, subject score, integrated text score, etc);
reference to Exercise Description structure (EDS);
reference to user Object (103);
reference to PASS object (108.107);

The next step is module (107.004). This creates a new branch in the processing road. In this case the structured content type requested from (107.003) will provide database query for getting structured content from database (module 107.005) and transferring the structured content to Presentation Layer (module 107.009). In that case, when the request is to a scheduled content, module (107.005) makes a fork to module (107.007), which is responsible to get data to describe scheduler for current content. When user needs to work with Real time learning content, the module (107.008) provides all data in that case. The module (107.010) will transfer the data to Exercise Generator Module (113). Module (107.013) is data block that represents URDS data structure.

Step (107.011)—"Send Structured content to Presentation Layer" occurs after step (107.006). This process is presented by serialization of data structure in XML format that uses a common interface between Presentation Layer and Executable Layer. Such interface makes Presentation Layer independent from those modules which provide data for it.

Exercise Generation block

Exercise Generation block 16 of FIG. 1 comprises: Exercise Generator Module (113), Dictionaries and Picture Dictionaries (112), Media and Music Libraries (115,116), Text Interactions (118). Exercise Generation block 16 provides all data for implementation of exercises.

Figure 4:
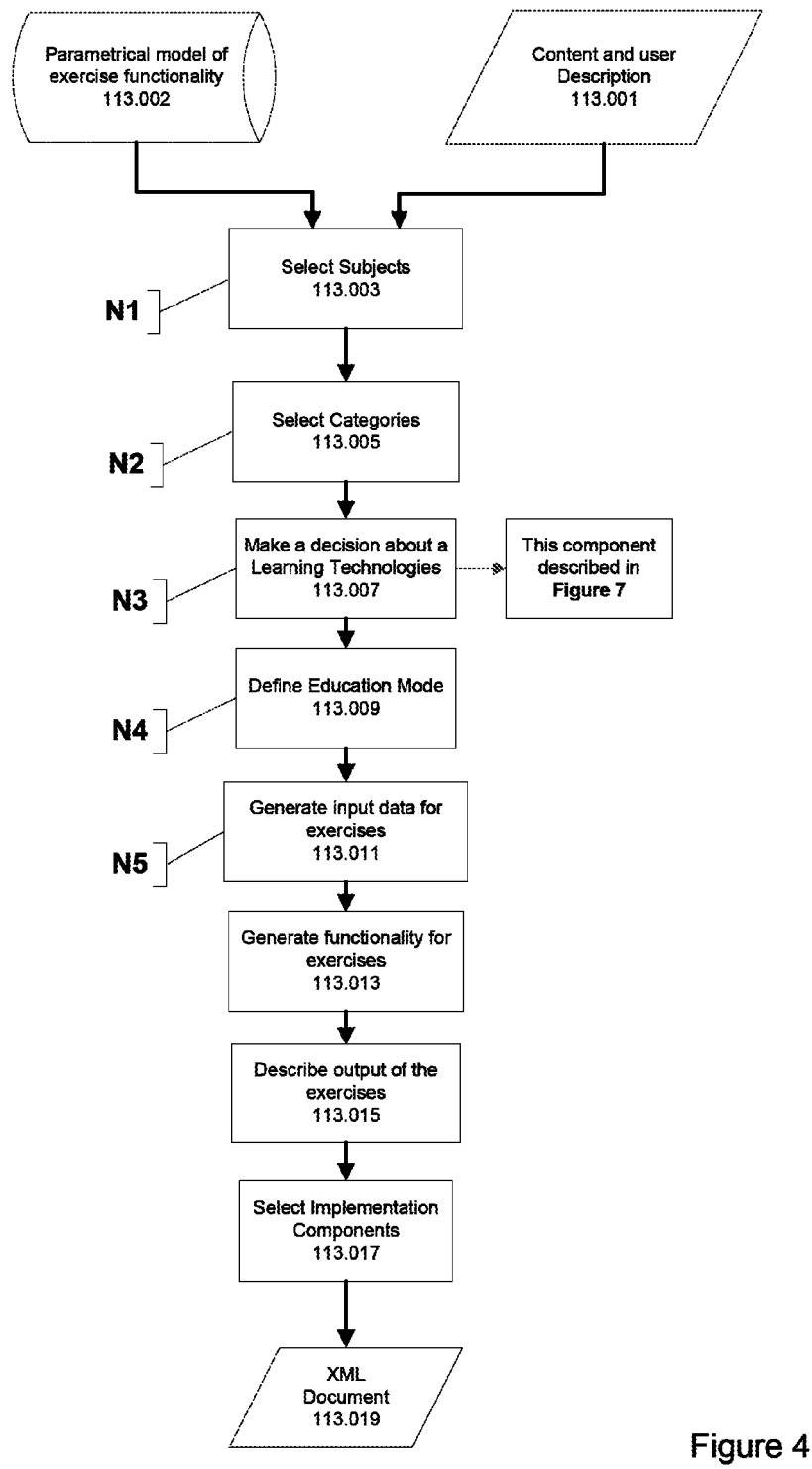
FIG. 4 is a representative illustration of the steps taken by exercise generator module of FIG. 1 identifying elements N1 through N5.

Reference is now made to FIG. 4. Exercise Generator Module (113) input data contains URDS that includes all data about user request and chosen learning content. A parametrical model (113.002) of functionality for the exercises is the main based platform for exercise generation. This model has been constructed to bring a formal approach for an exercise generating process. It allows the creation of a scalable, reliable and increased mechanism process.

Exercise Generator Module (113) consistently processes URDS data according to the model parameters. The number of processing modules equals the number of parameters, which the model includes as follows:

"Select Subject" module (113.003); (1)
"Select Categories" module (113.005); (3)
"Make a decision about a Learning Technology" module (113.007); (4)
"Define Educational mode" module (113.009); (5)
"Select functionality type" module (113.011); (6)
"Generate input data" module (113.013); (7)
"Describe an exercise output" module (113.015); (8)
"Select Implementation Components" module (113.017); (9)

All modules make selections and requests to the database under control of URDS, paying attention to individual features of the user and the achievements and goal settings. The building of the user model starts when the Subject is selected (113.003). This procedure depends only on the UD (User Description) and if the system is processing structured learning content. For Real time Learning Content the Subject is selected only from the users CD (Content Description). Scheduled content assumes the use of both CD and UD. Next step (113.005) will select category or main framework to build the exercises. Step (113.007) provides duties to select a learning technology. And so on.

For example, a user makes a request to learn a subject (1) as "Clouds". The content for learning a topic is selected by the user. This means the content is real time content (2)—user's choice. Accordingly, the user's achievements for category (3) exercises were selected as multiple choices, filing forms, visual choices and finding rules. Learning technologies (4) selection was Syntality's; visualization, associations, mind webbing and then note taking. Educational or teaching mode (5) was as explanation and training mode. The created approach (6) was selected as that one which needs to generate only input data. The input data (7) for exercises in this case has to be gotten from databases. To learn a terminology of the subject it will get synonyms and rhymes for keywords from Dictionary and Thesaurus. To learn meaning, sense and communication links inside the subject may get questions and answers from sources such as the online Wikipedia encyclopedia and book repository. This information will be used to create comprehension test as multiple choices. The information selection from all database collections provided by "search" function were search parameters includes estimations of user's skills and user's knowledge level such as, language level, personal dictionary size, comprehension level, goal settings, favorite topic, preferences, etc. For this example, the output creation (8) will include personal dictionary creation (association links, Syntality pictures, notes, learning score for new words) and note taking pages for a summarization of new knowledge.

An output of module (113) is an object that we will call EDS—Exercise Description Structure. Each component of EDS describes one exercise. The content of EDS is defined accordingly as model (113.002). XML implementation of EDS was made under SCORM. A reference of EDS will be included in the URDS.

Figure 5:
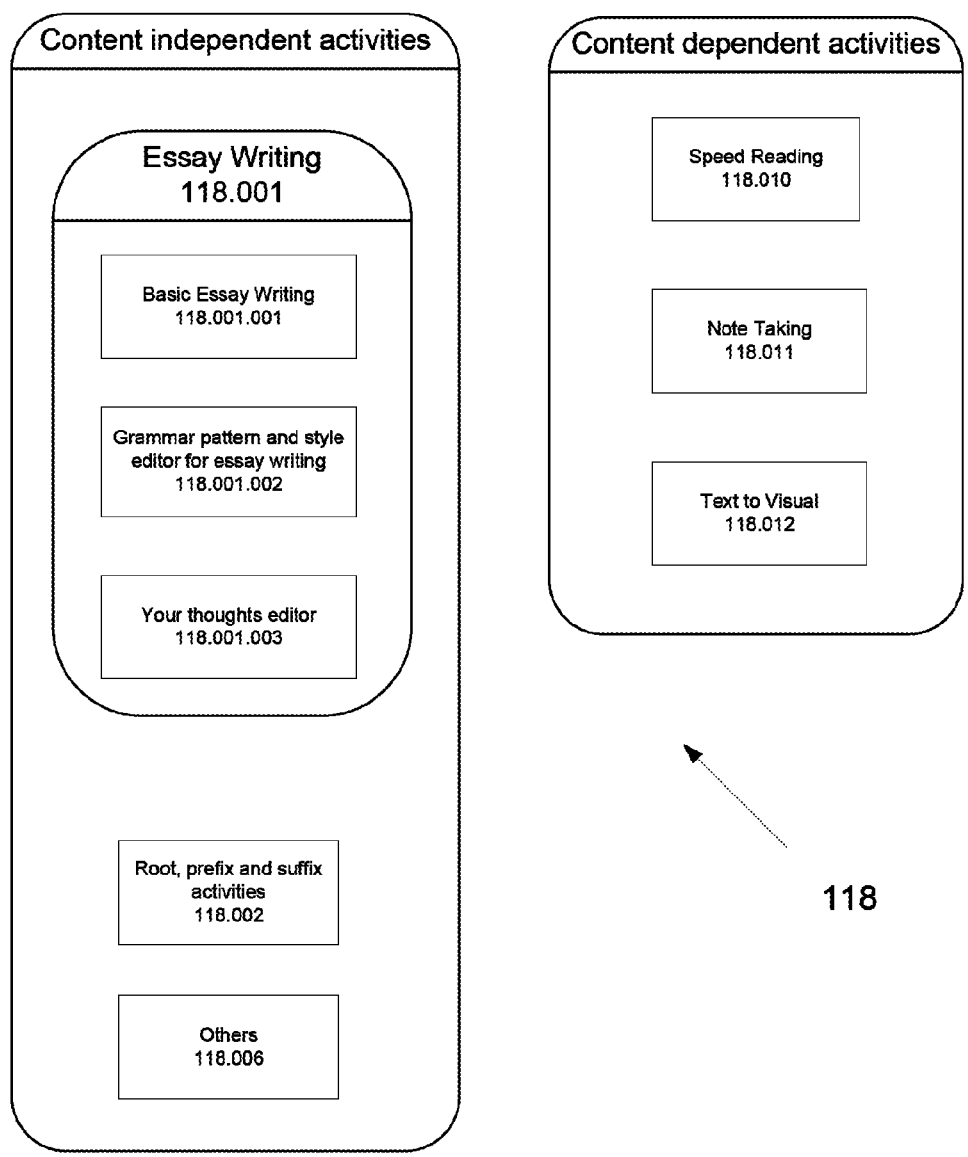
FIG. 5 is a block diagram illustrating the components of the text interaction exercises module of FIG. 1.

Reference is now made to FIG. 5. Text Interaction Exercises module (118) works independently from Exercise Generator Module (113) data. It includes two parts.

First one contains modules which don't use real time content. These modules are called content independent activities. They are responsible for the creation of data or information. In other words these modules make synthesis of a text or visual information. These modules are:

Essay Writing (118.001)
Root, prefix and suffix activities (118.002)
Others (118.003)—karaoke, phonemes training, visual patterns gallery, and much more.

Second part contains modules that use real time content for there activities.

These modules are responsible as an analysis and synthesis of information presented. They are:

Speed Reading modules (118.010) provides eyes training exercises and speed reading tests.
Note Taking modules (118.011) provides text content meaning extraction preparation procedures and note taking format writing procedures.
Text to Visual module (118.012) provides a pictureliation (to transform or to show a text as pictures or animated clips) of text by different sets of words.

All these modules use the current real time textual content as input data.

Generated Exercise Modeling (113.002)

Figure 6:
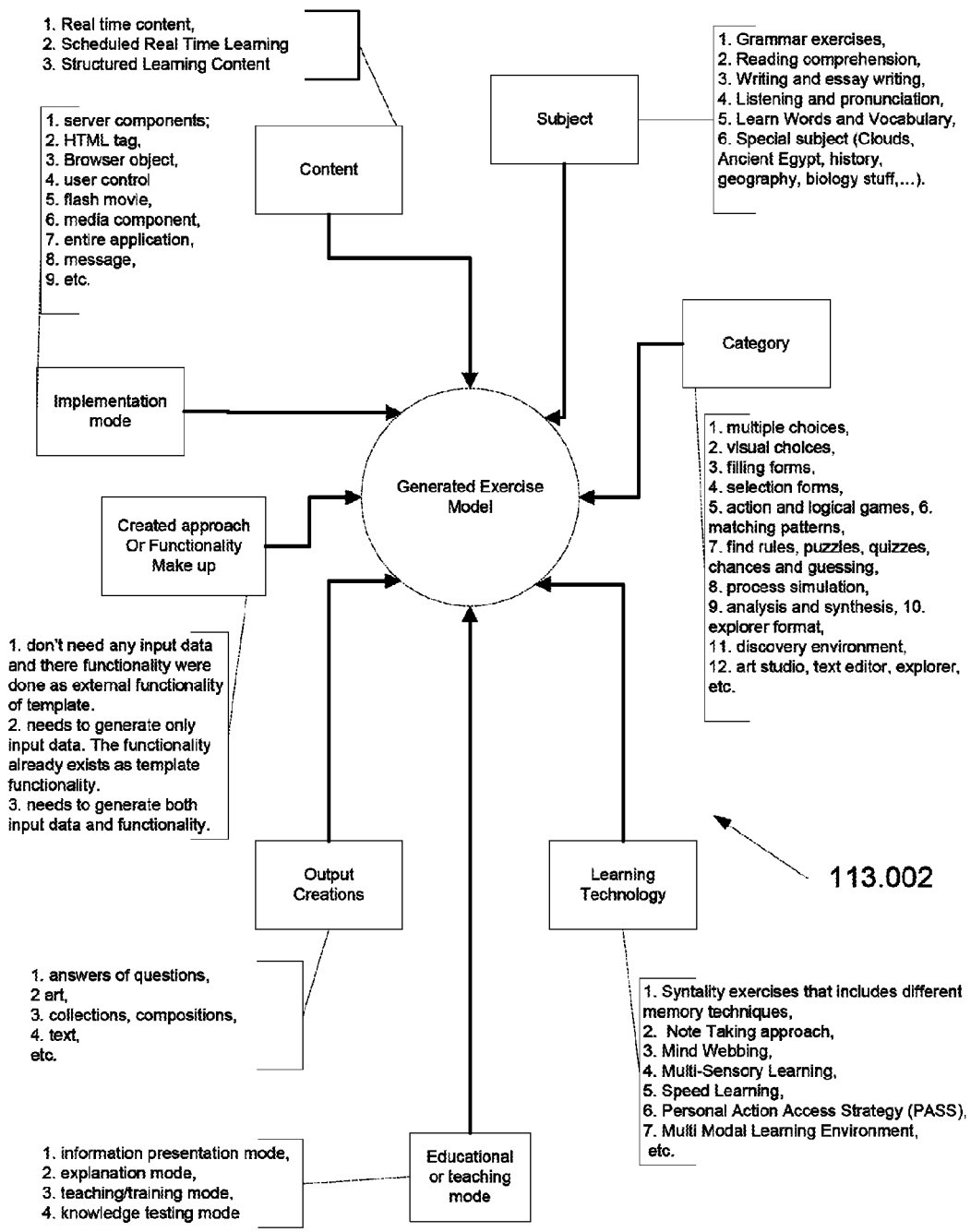
FIG. 6 is a schematic diagram illustrating the Generated Exercise Model of the exercise generator module of FIG. 1.

Reference is made to FIG. 6. Generated Exercise Model (113.002) is a parametrical model that is the algorithm base for Exercise Generator module (113). Generated Exercise Model (113.002) provides such unique opportunities for self-teaching and self-learning of any textual content in real time, with real time motivation levels/status, with life long skills training, different learning technologies as modern data processing techniques. In order to build such kind of system, it is preferable to apply online processing mechanism. For online processing, the system has to be armed by automated procedures.

A process of online exercise creation is an entire automated process based on parametrical model. An exercise represents main learning cell or a chunk of data in the learning process.

The modeling process is the method that system uses to determine the classification of exercises. This model (113.000) includes eight parameters to describe all components and functionality of the exercises. There are:
- Content type;
- Subject;
- Category;
- Learning technology;
- Educational mode;
- Exercise output type
- Generation functionality mode;
- Implementation mode;

The parameters allow a building of a formal procedure for exercises synthesis. Formal approach significantly simplified an exercises creation.

By categories exercise templates are presented such as: multiple choices, visual choices, filling forms, selection forms, action and logical games, matching patterns, find rules, puzzles, quizzes, chances and guessing, process simulation, analysis and synthesis, explorer format, discovery environment, art studio, text editor, explorer, etc. One of these is known as doze training, sometimes referred to as 'fill in the blanks'.

By subject exercises are presented as: grammar exercises, reading comprehension, writing and essay writing, listening and pronunciation, learn words and vocabulary builder with any subject matter as; (Clouds, Ancient Egypt, history, geography, biology, etc.). One of these is types of exercises is Subjects and Predicates.

Application of the preferred embodiment to the example of 2000-4000 textual input characters, by simple math, shows results based upon the number of data combinations and the number of different template data. With a doze training template the calculation will show how many exercises are expected to be available for generation with this template and with this exercise subject and a 5 unit multiple choice format. The formula used is: Max Number of exercises=((sentN+Sub+predN)!/(((sentN+Sub+predN)−5)!*5!), where 5 is the number of multiple choices in each question. The maximum number of exercises available in this calculation=(50+20)!/(((50+20)−5)!×5!)=90345024. The N elements are set out on FIG. 4, for examples, as N1={Select Subjects 113.003}, N2={Select Categories 113.005}, N3={Make a Decision about a Learning Technologies 113.007}, N4={Define Education Mode 1113.009} and N5={Generate Input Data for Exercises 113.001}.

In FIG. 4 element 113.002 (Parametrical model of exercise functionality) is the data from FIG. 6 and includes the number of parameters (referred to as P), particularly subject, category, learning technology, teaching mode, output creations, functionality implementation mode. Each of these parameters has a value. The number of values for each parameter is Nm. This shows that the number of possible combinations (C) is C=N1*N2*N3*N4 . . . *Nm.

Element 113.001 (Content Description Structure CDS) is the output from the from the Content Processing Module shown in FIG. 2 and contains syntactic links (sentences and links inside sentences, among others), semantic links (semantic schemes subjects, predicates, internal and external links), grammar rules) tenses, parts of speech, preposition phrases, among others) and the keyword structure (keywords with coefficients and highlights).

Figure 7:
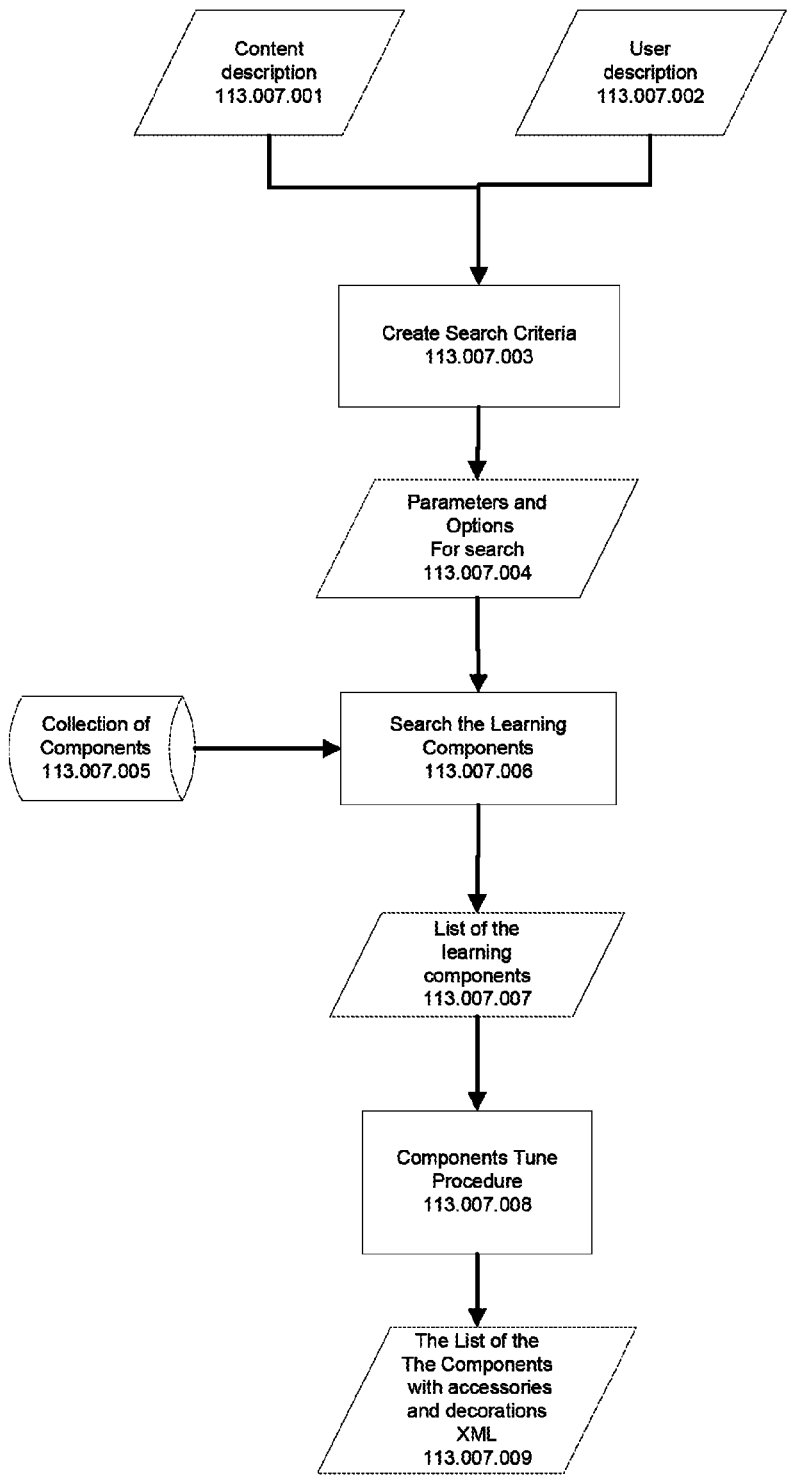
FIG. 7 is a representative illustration of the steps taken by the learning technology selection module of the learning management module of FIG. 1.

Element 113.007 (Make a Decision about learning Technologies) refers to FIG. 7 where block 113.007.006 uses block 113.007.005). This block is presented in FIG. 8 as a list of learning technologies where each one includes a list of algorithms and approaches. This list of learning technologies increases the combinatorial nature of the preferred embodiment of invention for a huge variety of variations.

Notionally, If one user operating the system in this single form would spend 1 minute for each exercise, completing all available exercises would take 300 years.

It can be seen that with this preferred embodiment the number of actual exercises available to the user is essentially endless, especially with larger input textual streams and the variety of exercise functionalities.

By learning Technology exercises are presented using Learning Formats such as: Syntality exercises that include different memory techniques; Note Taking approach; Mind Webbing; Multi-Sensory Learning, Speed Learning; Personal Action Access Strategy (PASS); Multi Modal Learning Environment, etc.

By educational mode exercises are presented through; information presentation mode, by explanation mode, teaching/training mode and knowledge testing mode. Each mode assumes to present the same information by different shape and way. Explanation mode assumes to use a lot of additional information to describe correct actions or data. In explanation mode score system doesn't use all estimation observations. The Training mode uses estimation for listening and full mode estimation calculation, but with minimum explanation of information. The test mode does not assume any support during an exercise performance. In the test mode a user can only see the final achievement score.

By way of representation learning content exercises can be presented by Real Time Learning content, Scheduled Real Time Learning content and Structured Learning Content. Real Time Learning content is any information from anywhere. Such kind of content assumes a necessity to use content processing module to extract data that can be capable to describe meaning of content, classify features of the content and to get information to generate exercises from this content.

Scheduled Real Time Learning content presented by generated prepared data structures, which were created as combination of Real Time Learning content and scheduling data.

Structured Learning Content assumes the existence of a suite of services called by some a "Learning Management System" and by others a "Learning Content Management System", and formerly called a "Computer Managed Instruction" system.

By way of generation of exercises that is presented by an approach which uses input data and functionality for an exercise. First group includes exercises that don't need any input data and the functionality is done as external functionality of template. Second group needs to generate only input data. The functionality already exists as template functionality. Third group needs to generate both input data and functionality.

By student creation or exercise output it is possible to have different kind of user creations as output or result of learning exercises. It can be answering of questions, different art collections, compositions, text, etc.

By an implementation approach, all exercises are presented as collections of forms. The forms can include items that are implemented as components; as a text, a picture, HTML tag, Browser object, server control, flash movie, media component, entire application, service, etc. Defined compositions of items in forms are called templates.

Learning Technology Selection Module (113.007)

Exercise generator module (113) includes Learning Technology selection module (113.007), which provides information for building of the parametrical model for exercise generation processes. It provides selection and description of learning technology. Description of learning technology is part of Exercise Description Structure (EDS).

Reference is made to FIG. 7. The Learning Technology selection module (113.007) contains following procedures and collections:

Create search criteria procedure (113.007.003);
Search the Learning Components procedure (113.007.006);
Components tune procedure (113.007.008);
Components collection (113.007.005)

URDS includes all data about user's request and chosen learning content presented in this module by the Content descriptor (CD) (113.007.001) and User descriptor (UD) (113.007.002). CD (113.007.001) includes data, which it extracts from input text, as:

main text subject;
main text framework or internal scheme;
text vocabulary level;
keywords or main idea;
tenses;
place, time, relative and viewpoint adverbs scheme;
etc.

UD (113.007.002) includes data, which is gotten from user current achievements. It is:

known and unknown words in input text;
user score by language subjects or by subjects;
user vocabulary score by words;
history for user's creations;
etc.

A comparison of CD and UD produces an efficiency estimation data, where current input text and user learning/training requirement will be analyzed together in order to answer the question: "how useful is the current text for current user skills improvement?" or "what kind of user's skills can be improved by exercises using current text?".

Select Learning Technologies Module (113.007) provides interpretation of UD and CD. The main function here is to create a request for a component collection to get learning technology description correspondence to CD and UD.

After working of the procedure (113.007.005) a list of components (113.007.006) represents the learning technology to be found. Next step (113.007.008) will specify properties of components to get accessories and decoration options for components.

Collection of Components, Learning Technologies (113.007.005)

Figure 8:
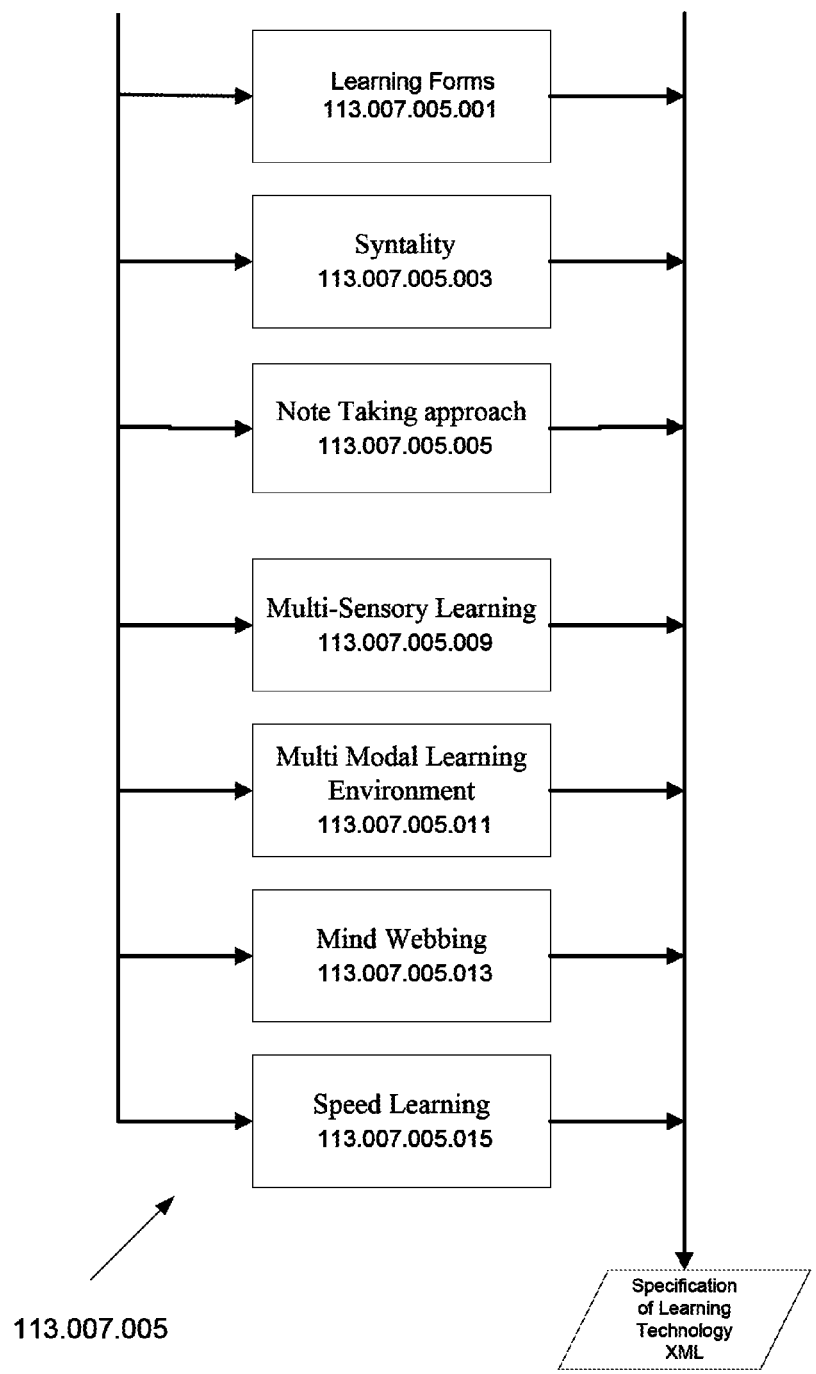
FIG. 8 is a schematic diagram illustrating the collection of learning technology components of the exercise generator module of FIG. 1.

Reference is made to FIG. 8, which illustrates Collection of Learning Technology Components (113.007.005). Collection of Learning Technology Components (113.007.005) is included within exercise generator module (113) and provides collections of components that are used as learning technology representatives in the RTL system 10. Collection of Learning Technology Components (113.007.005) contains a collection of components. Each component in this collection presents object-oriented model of a learning technology. They would implement the following learning technologies:

Learning Forms or Pages,
Syntality exercises that includes different memory techniques,
Note Taking approach,
Multi-Sensory Learning,
Multi Modal Learning Environment,
Writing Technologies,
Mind Webbing,
Speed Learning.

The Learning Forms (113.007.005.001) approach presents learning formats, which is described by HTML pages format. It is an analog of teacher assignment or a sheet of paper as traditional learning chunk. This approach can implement such exercises as reading, writing, spelling, listening, etc.

Figure 9:
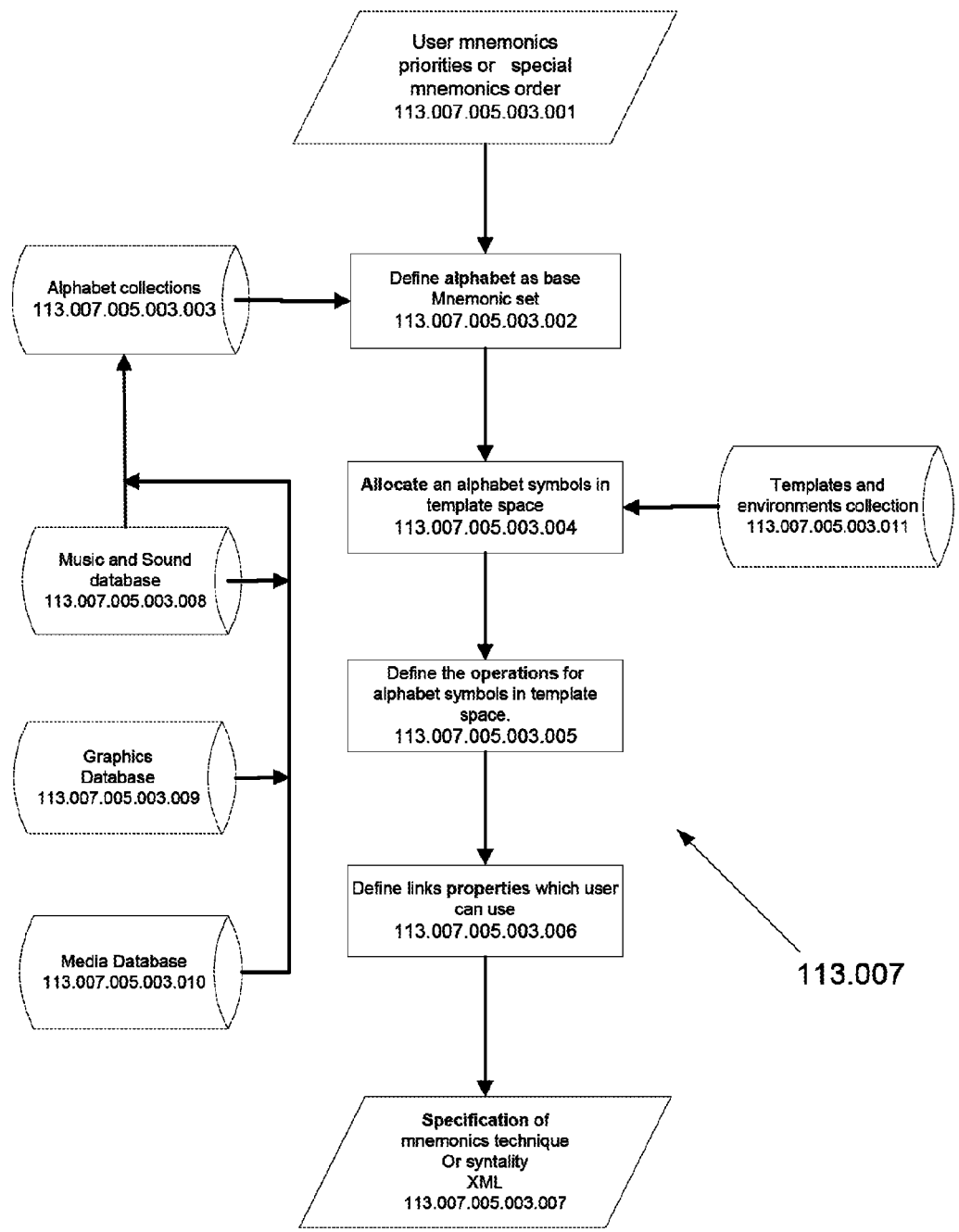
FIG. 9 is a representative illustration of the steps taken by the Syntality component of FIG. 8.

Reference is now made to FIG. 9. Syntality (113.007.005.003) is a collection of memory techniques, which use different kinds of associations for memorization of data. All techniques are based on creating links between well known objects or elements, called carrying components, and unknown objects, called carried components. Carrying components and Carried components can be anything, including real objects and components of virtual world or part of dreaming. The components can have any nature: sound and music, drawing and painting, solid and liquid, etc. A creation of a correspondence (association link) between carrying and carried components is called mnemonics creations. First author of modern mnemonics was Giordano Bruno (1548-1600) an Italian philosopher, an expert on the art of memory, he wrote books about mnemonic technique.

All techniques have a difference which depends on the system organization of the carrying components. To develop mnemonic technique we need to define an alphabet (113.007.005.003.002). This alphabet is presented as an ordered collection of carrying components. Collections of alphabets (113.007.005.003.003) are provided by the system. Some of them contain:

1. Real Word Components. This alphabet includes graphics that represent images of real word objects. Such kind of alphabet for mnemonics becomes valuable and useful when user needs to get training: how to use the real word environment around him to improve memory skills. By using this type of alphabet the user will have two benefits. User will not only improve their memory skills but they will be able to pay greater attention to their personal environment that has meaning from ecology view point. Also user can learn how to estimate their own position in this real word place through personal associations.

2. Virtual Word Associations. This alphabet includes graphics that are images to magic, unreal things or any contrivance and make ups. Only user imagination can restrict list of graphics that are in this alphabet. This alphabet put together in one training process a personal user imagination to create own personal world and personal user organization skills to create control inside personal world. In this case, memory training comes through an utilization of the user personality by a combination of so important skills as organization and communication skills.

3. Systematical symbols set. Such kind of alphabet represents numerical or alphabet symbols.

4. Sound, Rhythm and Music Associations. Such kind of alphabetical symbols can be used for remembering of words when mnemonics techniques are used in such categories exercises as games, karaoke, singing, etc.

Also each alphabet should include for mnemonics sets a system of a conformity, a system of an accord, a system of patterns, a combination of all these systems. The step (113.007.005.003.004) presents a process that provides correspondence between selected alphabet elements and environment collection. Depending on the education purposes Syntality can get different locations or positions for alphabet symbols in different environments. The step (113.007.005.003.005) provides operations that have to be implemented in presentation layer for this learning technique. Set of operations, which can be used, are; create, remove, update, select, get and set properties. The property of alphabetical elements includes a position, a size, a color, a shape, a style, a mode, etc.

One of the important properties of the alphabetical elements is property that describes links between this element and other alphabetical elements from one hand, and between this element and elements which user can create and which are called carried components.

Therefore, module (113.007, 005.003) is generating the Syntality as mnemonics learning technique. Input data (113.007.005.003.001), as request to create the Syntality, will get from CD (113.007.001) and UD (113.007.002). The specification (113.007.005.003.007) of the Syntality contains hierarchical structure (the environment) filled by alphabetical elements and description of internal and external links to these elements.

Note Taking approach (113.007.005.005) Note Taking approach includes a collection of procedures, which provides information and processing support for Note Taking activity.

The information includes:
summary with keyword highlights;
graphical chunk of page with drawing keywords position;
correspondences between number of sentences and keywords;
pictures for keywords;
Processing support procedure includes:
formatted Note Taking Page maker;
customization of user Note Taking format procedure;
others;

Multi-Sensory Learning (113.007.005.009) is a set of all possible ways of the actions using all communications systems (senses) of the person. Through human's various sensations such as visual, auditory, touch (tactile), movement (kinetic), and reasoning capability, people can accomplish learning process in the modals of hearing, speaking, reading, and writing.

Multi-Sensory Learning technology is based on a framework with content management mechanism for learning content structure, description, representation, retrieval, reuse, revise, retain, exchange and sharing possibilities.

Multi Modal Learning Environment (113.007.005.011). These procedures includes interface modules that provides data formatted for different devices such as smart devices, wireless, web browser, messengers, desktop computer, also for simple players and iPOD devices.

Mind Webbing module (113.007.005.013). implemented as structure and graph data editor. It allows user to create different links between words and pictures. Each link can be named. For each link a user can create notes or comments. As result, mind webbing picture will be a graph with words and pictures as nodes and named links will make connection between nodes.

Speed Learning module (113.007.005.015). contains four independent parts:
Skim information support module. It provides very fast and light reading. User can apply skim procedure, when user needs to find only purpose of information. This module implements such functions as: —speed reading template for scrolling text with different speed and text fonts and colors; —template to visual keywords and summary.
Scan information support module. It provides possibilities for quick organized reading to find interpretative meaning of information. This module includes previous module actions and adds more templates with main text characters and comprehension reading test template.
Study information support module. It provides most active slowest reading to find deep analysis of information. Main menu for this module includes following items: Reading—scrolling text, switch eyes; Visual information: Visual keywords, Visual main characters, Text to Visual; Content information: Who and what, What is happened, Past-Present-Future, Details; Summary;
Eye movement and Speed Training. It provides templates for eye training such as scrolling, running, flashing text, switching eyes and flashing word templates. Also Schulte's tables templates includes in this part to train eyes without any text. Speed reading skills can be tested by special test templates.

Reference is now made to FIG. 5. Essay writing module (118.001) provides an easy and effective way to quickly write essays. Essay writing module (118.001) comprises three parts according to a user's writing skills
Basic essay writing (118.001.001)
Grammar pattern essay writing and style improvement editor (118.001.002).
User's visualization and key words editor (118.001.003).
Speech to text Basic essay writing module (118.001.001) provides writers from beginners to University level structured templates for mental outputs. It is implemented as a Wizard that systematically notes one (1) word at a time to simplify the initial writing output process. Grammar pattern essay writing and style improvement editor (118.001.002) is responsible to provide support for the user to write advanced grammar structure sentences. More than 150 grammar patterns help to create grammar correct sentence. The base approach helps to create few sentences with different grammar patterns for the same idea and than select that pattern which corresponds and expresses the idea better. In addition, this module supports functions, which help to improve text by selecting similar words from the dictionary.

The visualization and key word editor (118.001.003) helps to edit unstructured thoughts from the user's brain to the selected templates quickly. The user makes plans and order, to generate sentences by thought fragments.

Basic Essay Writing Module (118.001.001)

Basic essay writing module (118.001.001) aids a user to master essay writing skills from beginners to writer blocks and to make the writing process as unstressed, easy and comfortable as possible for the writer. By creating these templates it will allow a user to write a 50 word essay in 15 minutes or a 100 word essay in 30 minutes or a word essay in 50 minutes, etc. and get a much higher mark with much less stress.

Basic essay writing module (118.001.001) utilizes a procedure that is implemented like a wizard dialog. All steps of the wizard are equipped for speech to text and for text to speech tools.

Writing is one of the major outputs from your Brain. Speaking is another. Now that you have learned "something" it means you have some knowledge. You now have to tell a teacher or a parent or a Boss, etc. via a sentence, paragraph or story of what "You know". This means that you will have to describe the "Vision" or idea that you have in your Brain. How do you do this? There are about 180 rules for proper grammar and essay writing in English. Do you know all of them and how and when to use these rules. Most people do not and so we have structured Writing Skills to be able to take you level by level into constructing grammatically correct sentences with correct spelling faster then before. All the grammar rules and examples are at your "Clicktip".

In reading, you are creating a picture in your mind of what the "author" wants you to see and understand. Do you have to read every word to see and understand what the author was trying to tell you? Research has shown that you only need to know about 10% of the words in an article to give you a good understanding of what the author was trying to tell you.

Now in writing you have a picture in your mind and now want to tell a reader what you are seeing, thinking, feeling and doing so that they can begin to see and understand the vision or picture in your mind.

Therefore, if the teacher wants you to create a 100 word essay then all you need is to "Visualize" (see the picture in your mind) of the story you want to write about. Then in a relaxed position, you look into your Brain for only –10 key ideas or words from the vision or picture in your Brain. You type or speak these words into the computer. Never mind what order or if the word is good or not. Do not worry about spelling the software will help you to make sure the word is spelt correctly. All you need to do is to learn how to just quickly type or "speak" the key words from the picture in your mind. Your writing grammar level will be tied into your vocabulary level. The greater your vocabulary the more creative your sentence structure can be made.

Figure 10:
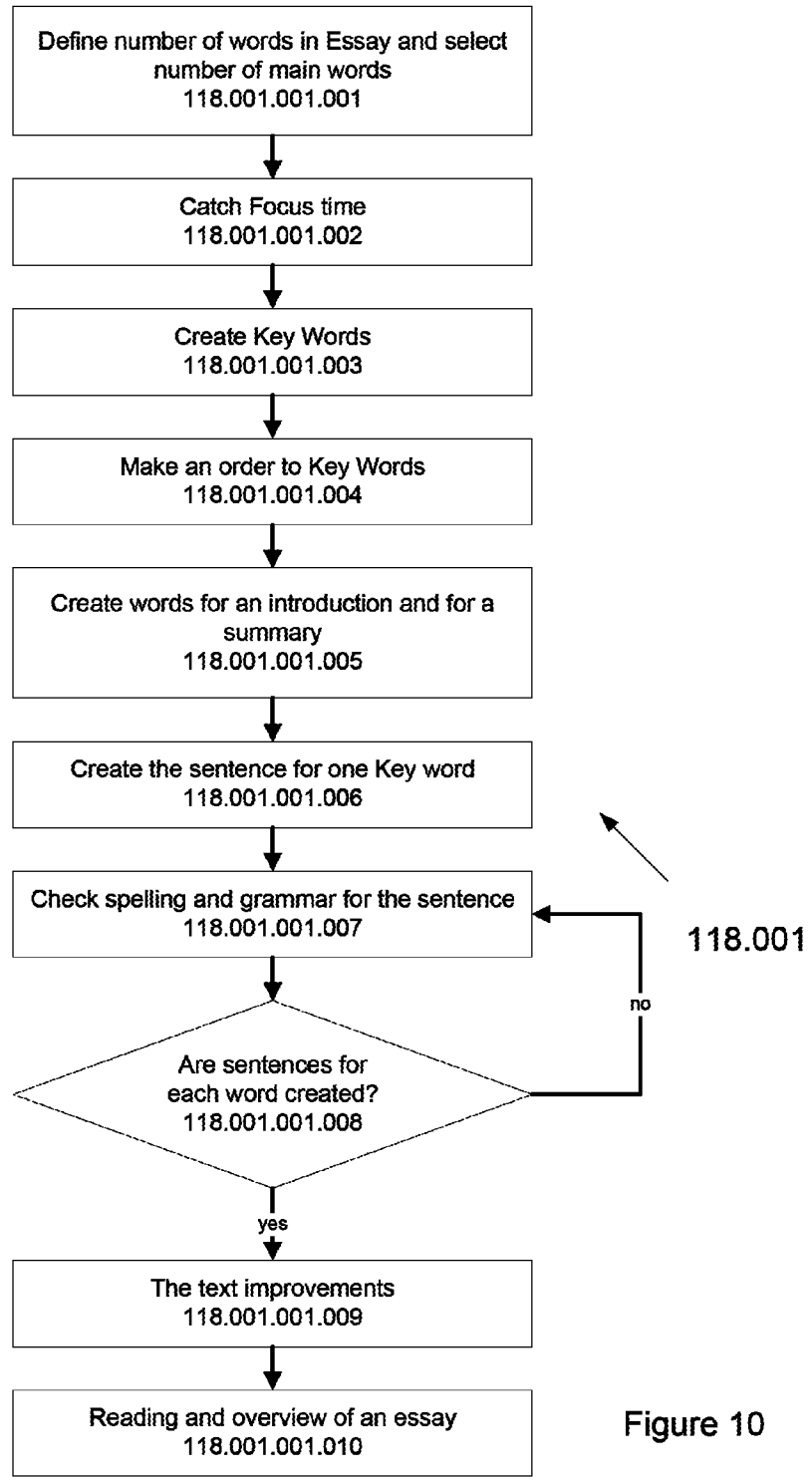
FIG. 10 is a flow chart that illustrates the steps taken by the basic essay writing module of FIG. 5.

Reference is now made to FIG. 10, which in a flow chart that illustrates the steps taken by Basic Essay Writing module 118.001.001. Define number of words in Essay and select number of main words (118.001.001.001)

How many words do you want in your Essay? Look at the drop down menu and "Click" on the amount of words you need to write in your essay. The Essay Wizard will help you to create an essay with the number of words that your teacher or you want.

Title: The first thing you have to do is to get a Title=T for your story. What is the story going to be called?

Catch Focus time (118.001.001.002)

Turn on the accelerated music that will play in the background LOOK inside your brain and (Visualize) THE OBJECTS, IMAGES OR IDEAS that are PART OF your Story floating through your Mind. Pick an object and type or "say" the word into the computer. If you have a microphone and or speech recognition software "say" the word. It will appear in the "keyword" section or main body of your Essay.

Create Key Words (118.001.001.003)

If your Essay is 50 words long then you will have to come up with "5" key words or objects from the story that you have in your Mind. This is 10% of your story and will form the base or foundation for your Essay.

Make an order to the Key Words (118.001.001.004)

Now look at your Words and place them in the "order that you want to tell your Story". Since 10% of your 50 word essay is 5 words then "Drag and Drop" the words you have created into the Body of your Essay;

B1.
B2.
B3.
B4.
B5.

Once you have organized the 5 words in the right order Click on "Finish".

The computer will then "freeze" the order that you have placed the words. This will become your "main body (B)" of your Essay.

Create words for an introduction and for a summary (118.001.001.005)

You will now have to provide two more words for the Introduction (In). This is were you tell someone what your Story is about;

In1.
In2.

Now place these 2 words in the order that you want to tell the beginning of your Story. Now Click on "Finish"

You will now have to provide 2 more words for the "Ending (En)" or "Summary". This is were you tell everyone the "Ending" or "Conclusion";

En1.
En2.

Create the sentence for one Key word (118.001.001.006)

You have now taken a small part of your story out of your imagination, out of your Brain and placed them into the Essay Wizard. You have reduced the "Big Picture or Story" in your Brain into small pieces. You will now have to take the small pieces and recreate the picture or ideas that you had in your Mind.

Now Click on "Finish" to begin the process of building an essay from these few "key words" from the images in your mind.

See how easy it was for you to come up with just 5 key words from the pictures you created in your mind! All you have to do is just practice relaxing and learn how to "see" or "visualize" the images or ideas in your mind that you want to write about.

Now you will have to take the first word and create a grammatically correct sentence around this word. The sentence cannot be longer then 8 words. That right. Your sentence is preferably shorter then nine words. Why? So that you can concentrate on creating JUST one (1) idea around each word. The shorter the sentence the better.

Once you have created your basic essay, The Essay Wizard will help you to add MORE Creativity around your words and sentences. Do not worry about being creative right now. Just construct a grammatically correct sentence. The Wizard will help you with each sentence.

Check spelling and grammar for the sentence (118.001.001.007)

Once you have completed your grammatically correct essay, The Essay Wizard will work with you to create a more interesting essay by showing you other words that you can use to replace the initial words, etc. Let us begin to construct a grammatically correct sentence.

B1="a word from your idea or picture in your brain"
Subject-Verb-Object
Example=;;;;;;;;;;;; ///////// """""""""" !!!!!!! etc Once you and the Essay Wizard have constructed a grammatically correct sentence, the computer will "flash" to let you know. You can now click on "Finish". The sentence will then drop down to the Basic Essay Box and the next word that you have put in order of writing priority "B2" will appear from the box beside the basic essay writing section.

B2="the 2nd word of your idea or vision in your brain"
Subject-Verb-Adjective
Example=;;;;;;;;;;;; ///////// """""""""" !!!!!!! etc As sentences for each word is created? (118.001.001.008)

You will have to repeat this process for the Introduction and then the Ending.

The text improvements (118.001.001.009)

Once you have created grammatically correcteded sentences with the help of the Essay Wizard, your Basic Essay will be a "READ ONLY". It is important that the basic essay stay the same so that you can refer to it at any time. The Essay Wizard will automatically create a Duplicate of your Basic Essay. You will now be able to "Improve" the creativity of your Essay utilizing the Wizard in the Duplicate to help you with selecting words and pictures that are more descriptive, etc.

| BASIC ESSAY (Is now Read ONLY) | DUPLICATE ESSAY |
|---|---|
| In1 | In1 |
| In2 | In2 |
| B1 | B1 |
| B2 | B2 |
| B3 | B3 |
| B4 | B4 |
| B5 | B5 |
| En1 | En1 |
| En2 | En2 |

Reading and overview of an essay (118.001.001.010)

When your Essay is ready, an application will process it and provide statistical information about your Essay as level of text, list of grammar rules, key words, etc.

Life Management and User Block 18

Life Management and User Block 18 brings the components of planning, estimation, motivation, goal management and time management, performance tracking into the learning process. It allows keeping the learning process as proved, customized, multifunctional, cognitive optimal process. All learning process properties define a learning efficiency and success.

1. User Object (103);
2. Life Management Module (104);
3. Personal Picture & Personal (Vocabulary) Dictionary (105);
4. Personal Action Success Strategy (PASS) (108);
5. User Life Management Database (109);
6. Remote Learning reminder Module (111);
7. User's personal database (119)

Figure 11:
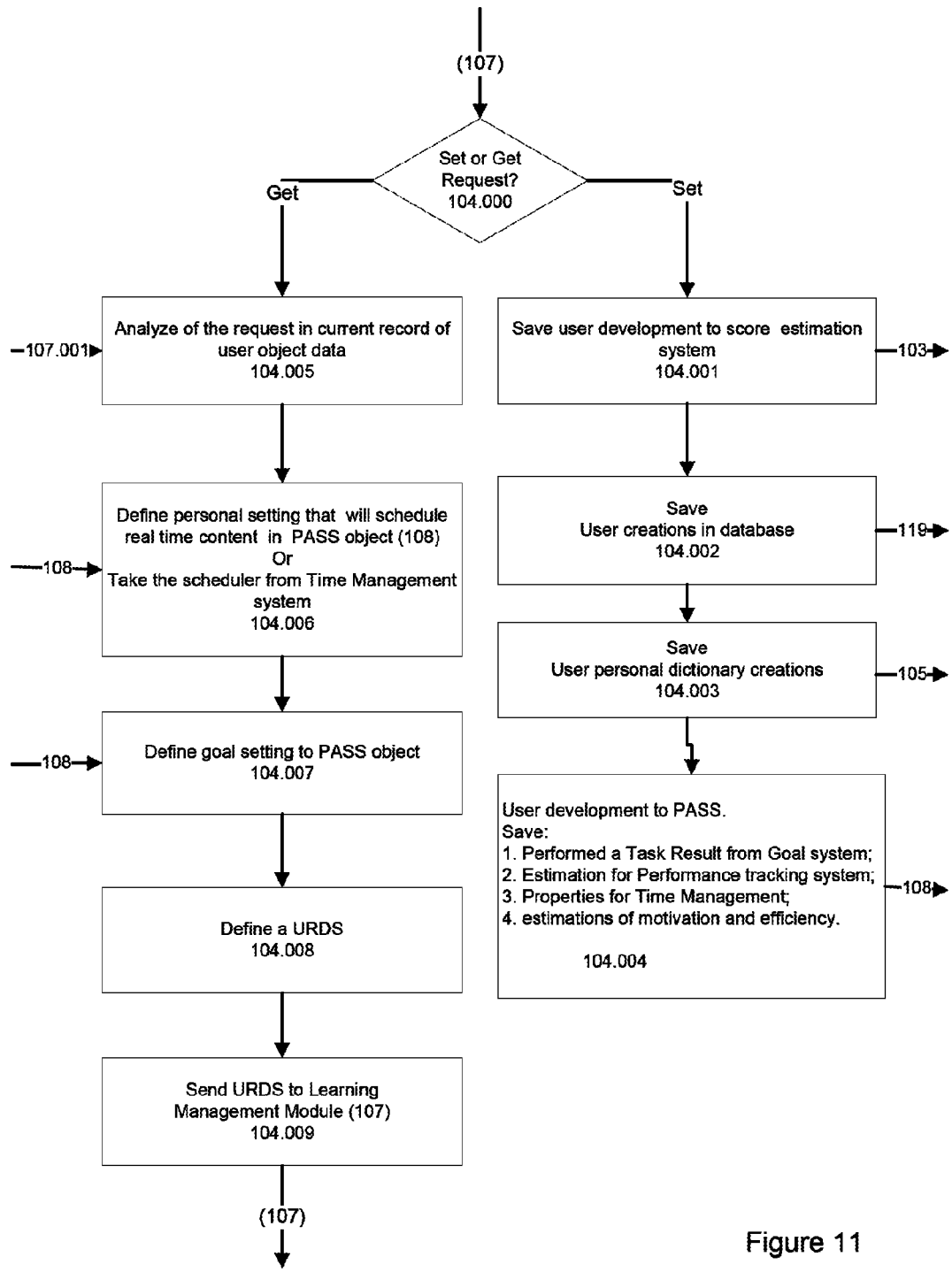
FIG. 11 is a flow chart that illustrates the steps taken by the life management module of FIG. 1.

Reference is now made to FIG. 11. Life management module (104) gets control from Learning Management Module (107)

It can happened in two cases—set or get data. In the case of "Set" data the request works when a user has finished an exercise or any process that was developed with some results that needs to be saved.

This module can save the following data:

A score estimation data in User object (103);

All user creation as text (notes, essay, words, sentences, etc) and graphics (pictures, clips, patterns, etc);

Personal Vocabulary Builder dictionary creations (105);

Information for PASS systems as Performed Task Result from Goal system,

Estimation for Performance tracking system, properties for Time Management system and estimation of motivation and efficiency.

In the case of "Get" data, the module (107) requested data as URDS. It happened, when user requested new content and the system has to generate exercises to this content.

Module (104.005) starts to analyze input data which is presented by content descriptor (107.001). The result of analysis is transferred to PASS (108) as request to build URDS for current content (CD). Module (104.006) will prepare information for PASS that will present a scheduler to execute the current content exercises. Module (104.007) will try to analyze goals and tasks in Goal Management system that will be correlated to current content. PASS object will get from the PASS system and add to URDS. The module 104.009 will transfer URDS to Learning Management Module (107).

User Object (103)

User Object (103) saves and operates with user description data. User Object (103) comprises methods and data to process user information.

User information presented by the following properties and fields:

membership info—user id, login, password;

personal info—age, bedtime, wake time, birthday date, address, phones, company name, etc;

Score and knowledge achieved statistics—language level; integrated score by skills, subjects, problem solving; motivation coefficient, efficiency estimation, vocabulary integrated score, user exercise history reference;

An instance of this object is created when a user logged into the system. Reference to this object is saved in URDS—User Request Description Structure. The procedure 104.001 changes object properties.

Life Management Module (104)

Life Management Module (104) provides data interface between Learning Management Module (107) and User Life Management part of system (103-106,111). The Life Management Module (104) creates a URDS—User Request Description Structure that includes data about user and current content. This module presents procedures that implement "set" and "get" requests.

Learning Management Module requests URDS in order to analyze content description and user information. The URDS includes all information that will make control to real time exercise creation. Also this data is used for structured content. Life Management module presented by two branches that serve two kinds of requests: GET and SET.

Main function of request GET is formation and filling of URDS fields. This request will be served by following procedures. Analyze of the content data from request (104.005) and define personal setting to create scheduler for real time content in PASS object (104.006). To get data about scheduler, life management module makes request to PASS module (108). Next request to PASS module (108) will be get data that describe goals and tasks, which correspond to current content (104.007). Procedure (104.008) will finish forming of URDS.

Main function of request SET is saving all data, which an user developed and created. User's development presented by four kinds of data:

A score that user has got to exercise and tests performance (104.001). The data will be saved to User Object (103);

User's creations such as essays, visual patterns, graphics, note taking, and any others will be saved (104.002) in personal database (119);

Data for User personal vocabulary dictionary is third kind of data that an user's creation can save (104.003) in User Personal Dictionary (105);

User life management data or PASS responsibility data (104.004):

1. Performed a Task Result from Goal system;
2. Estimation for Performance tracking system;
3. Properties for Time Management;
4. Estimations of motivation and efficiency.
5.

Personal Picture and Vocabulary Builder Dictionary (105)

Personal Picture and Vocabulary Dictionary (105), is a container to save personal dictionary data for each user. Personal Picture and Vocabulary Dictionary (105) may include a collection of articles. Each article contains following data or references:

word as text;
Reference to definition, synonyms and other data from Common Picture and Vocabulary Dictionary (112);
Reference to a picture for word or a graphics (movie clip) from Common Picture Dictionary (112);
reference to an user created picture;
reference to an associations pictures;
four numbers that are scores for word training result by pronunciation, listening, spelling, meaning;
update information date;
create information date;
Personal Action Success Strategy (PASS) (108)

Personal Action Success Strategy (PASS) module (108) implements a life management approach as background and based layer of learning process. The main functions of PASS module (108) are:
support a goal system as life motivation technology;
create scheduler for an effective way to reach goals;
provide multimodal support to the learning process;
provide full score estimation process;
create a recommendation for user learning process organization by current estimations.

Figure 12:
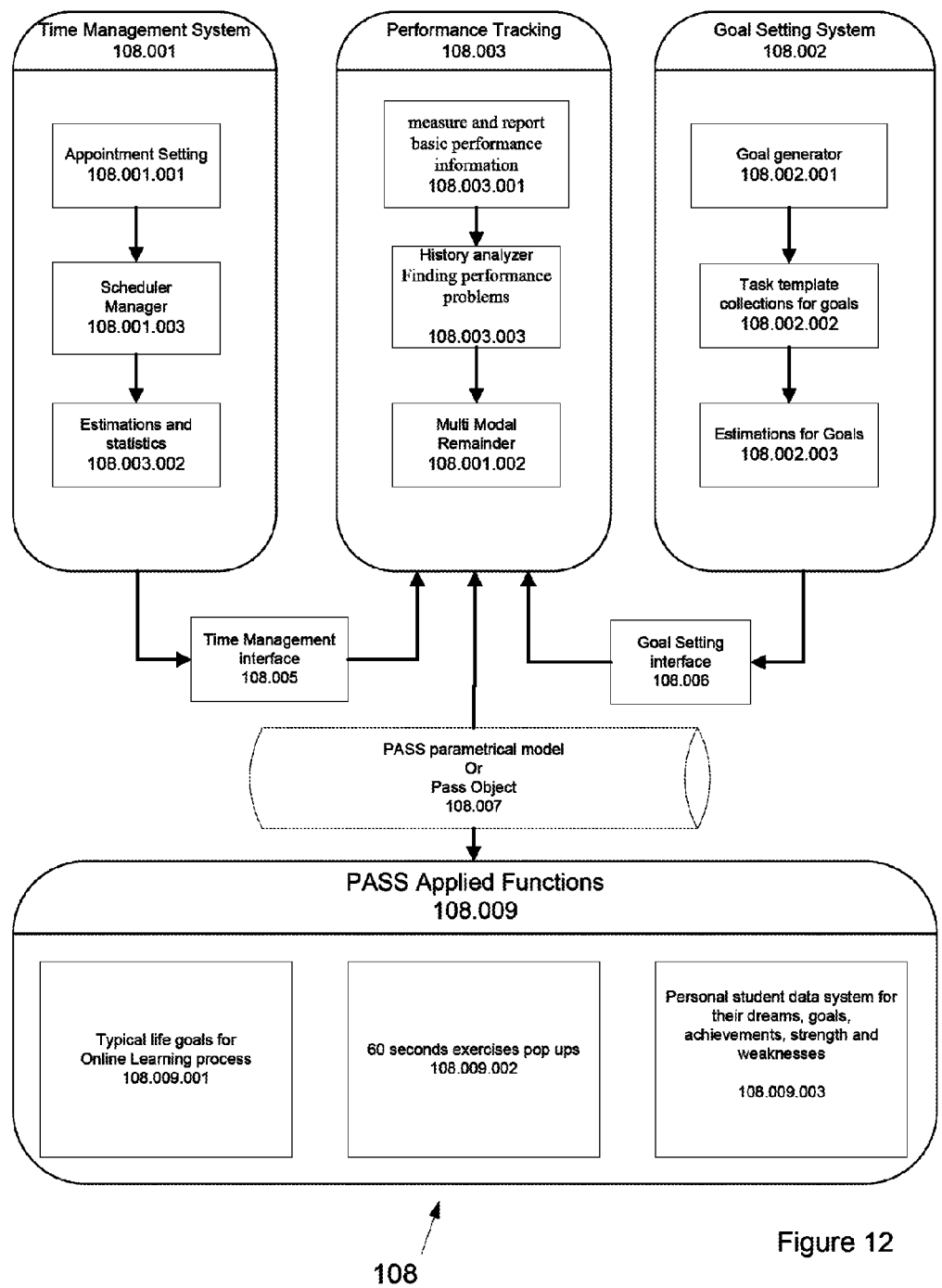
FIG. 12 is a schematic diagram that illustrates the components and functionality of the personal action success strategy (PASS) module of FIG. 1.

Reference is now made to FIG. 12. PASS module (108) Contains:
Personal Action Success Strategy includes strategies presents by subsystems:
Time Management System (108.001)
Goal Setting System (108.002)
Performance Tracking (108.003)
and tactics presented by Applied Functions (108.009).

PASS parametrical model or PASS object (108.007) is data interface for implementation strategy methods to a tactical approach. PASS is collection of systems that implements a technology to life management. Learning process is part of the user's life. PASS presents functions that guarantee effective management and organization of the learning process.

An exercise in the system presented by functional parametrical model (113) and PASS parametrical model (108). PASS parametrical model (108) contains:
Goal—each action in the system has to be defined as part of a goal. It means all activities will bring estimations to goal achievement and life will be defined as a set of goals.
Task—in order to reach a goal it is preferable to do some actions that we will call tasks. A set of tasks define a goal. Each task describes by task name, goal name, start time, end time, duration, task type. The task can have appointments for tasks performed. Task performance is a set of appointments. An appointment is a moment of time when part of task performance can start. Each appointment has data that describes action as, for example, start application, fair event, send message, etc.
Goal and task estimations—this estimation includes few numbers to describe goal and task success. Main parameters from this are: motivation, efficiency and progress and score.

The motivation is equal to a relation between the tasks that user did to all tasks which were accessible to performance in that moment. The efficiency shows how fast the score is changed. The progress is value in percentage which shows how many percentages of a task was done. The score is value in percentage which shows a relation between correct and wrong answers.

Performance tracking (108.003) gets input data from Learning Management Module (107). Also Performance Tracking can get control by events from Scheduler Manager (108.001.003).

Figure 13:
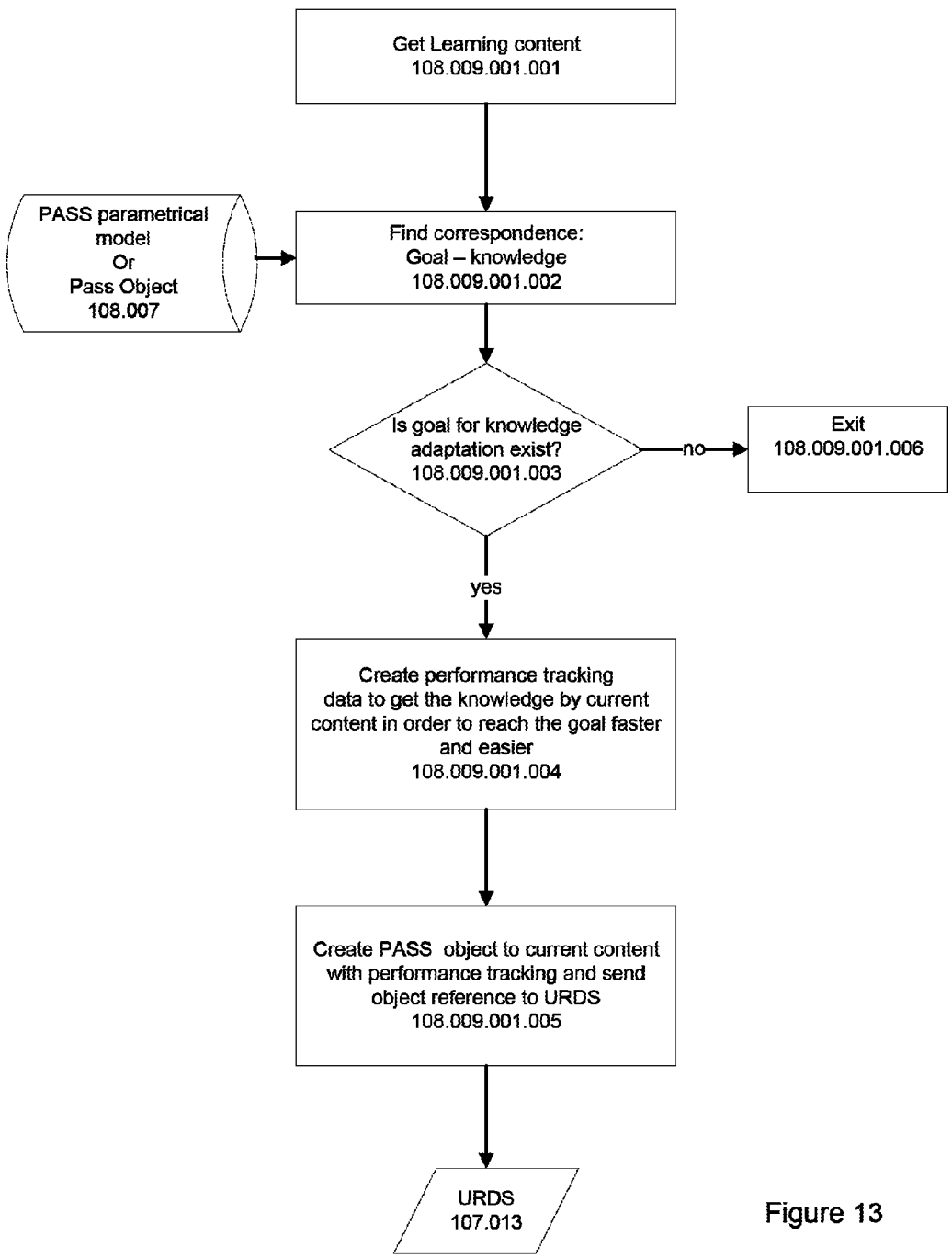
FIG. 13 is a flow chart illustrating the steps taken according to the typical life goals for online learning process of FIG. 12.

Reference is now made to FIG. 13. Typical life goals for Online Learning process (108.009.001) is practical approach to make connection between any user activity and typical life goals. A connection between the goal and user activity allow increasing an efficiency and motivation level of activity. Procedure (108.009.001.001) gets learning content and user information as URDS control block. PASS includes list of typical life goals that usually are applied to most people for life. Procedure (108.009.001.002) will find correspondence between goals and knowledge that user will get after learning current content. If such kind of goal exist (108.009.001.003), procedure (108.009.001.004) will create scheduler to learn current content and provide performance tracking for it. Performance tracking data will record (108.009.001.005) to PASS object and as reference in URDS will transfer to Remote Learning Reminder Module (111) that is responsible to launch exercises and reminders.

Figure 14:
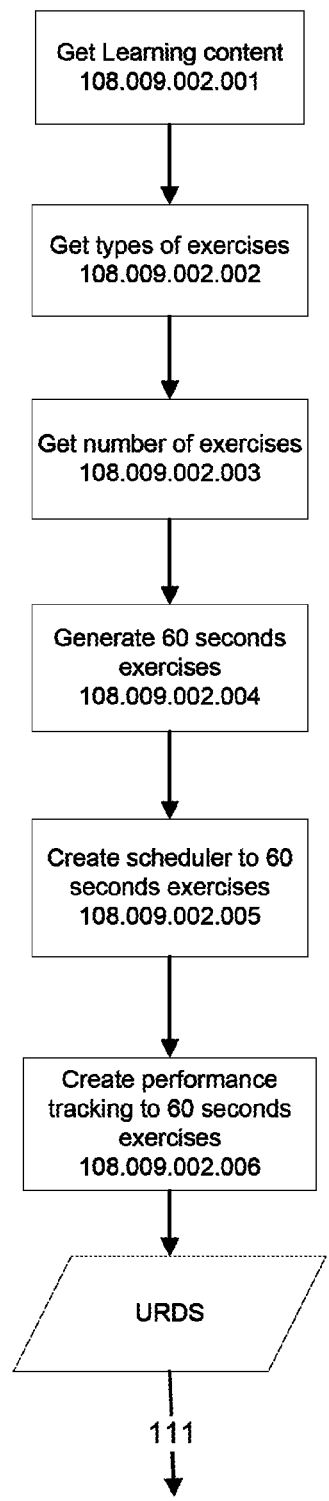
FIG. 14 is a flow chart illustrating the steps taken according to the 60 seconds exercises pop ups procedure of FIG. 12.

Reference is now made to FIG. 14. Set times and duration of a user's learned data are presented as short preset timed refresher Pop-Up exercises module (108.009.002) from seconds to minutes. First step (108.009.002.001) gets current learned content and procedure (108.009.002.002) defines types of exercises that will be launched by Pop-up reminders.
In the system, this procedure can be implemented as dialog procedure, visual or sound or combinations. Next step (108.009.002.003) specifies number of exercises and procedure (108.009.002.004) that can generate these timed pop up reminder exercises. Scheduler creator (108.009.002.005) is next step in this module.

In the final procedure performance tracking will be recorded (108.009.002.006) in PASS object for current content. Reference to PASS object is in URDS. This data will be used for controlling and launching timed, (15, 30 or 60-seconds, etc.) pop up exercises by Remote Learning Reminder Module (111).

It will be appreciated that while the embodiments of the real time learning and self improvement educational system 10 have been described in the context of various methods including methods for scaling multicolor and multilayer overlay images, it should be understood that it is equally applicable to other types of images. The system, processes and methods described are capable of being distributed in a computer program product comprising a computer readable medium that bears computer usable instructions for one or more processors. The medium may be provided in various forms, including one or more diskettes, compact disks, tapes, chips, wire line transmissions, satellite transmissions, Internet transmission or downloading, magnetic and electronic storage media, digital and analog signals, and the like. The computer useable instructions may also be in various forms, including compiled and non-compiled code.

It should be understood that various modifications can be made to the embodiments described and illustrated herein, without departing from the embodiments.

Figure 15:
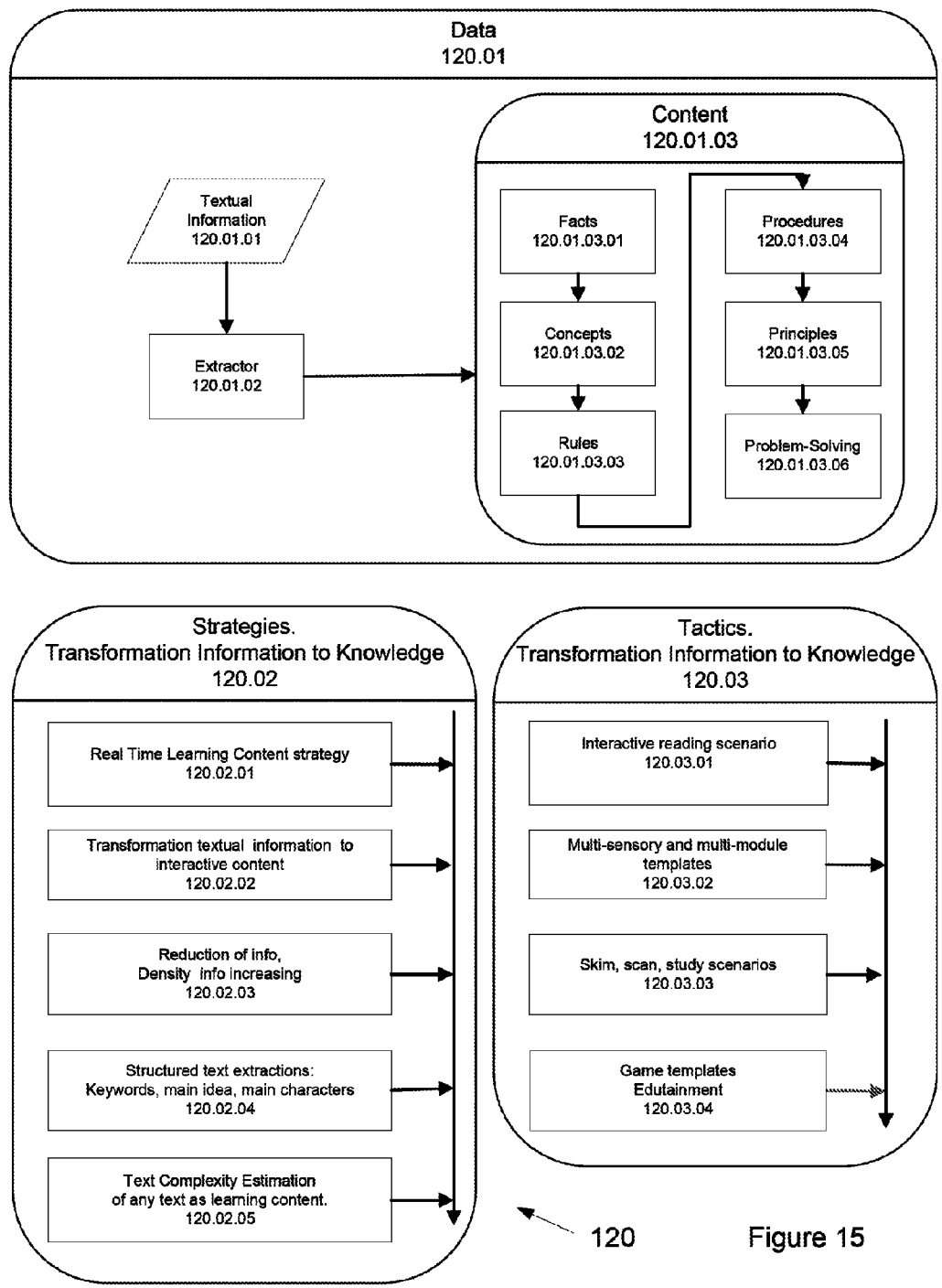
FIG. 15 is a flow chart illustrating the steps taken according to the Real time learning Modeling of FIG. 1.

Real Time Learning Model (120) FIG. 15

The modeling of real time learning process includes Content or Data (120.01), Strategies (120.02) as base ideas for organization of effective learning process and Tactics (120.03) as implementation of these ideas to the learning process.

Each learning process starts from preparing learning content or data (120.01).

The structure and meaning of data (120.01) defines a choice of strategy and tactics to organize the learning process. If the data presents facts (120.01.03.01), learning strategies can be present as remembering procedures:

Associate: Relate ideas to each other.

Visualize: Try to see pictures in your mind as you read.

Concentrate: Have a specific purpose, associating, and visualizing will help you to do this.

Repeat: Keep telling yourself important points and associate details to these points.

If data (120.01.00.00) is presented as concepts, there are additional approaches that corresponded to presented content. These are concept mapping, analogies, different kind of classification, etc. Therefore, for each kind of data the system has to provide special strategies of learning. If the content that the student has to learn is presented as textual information (120.01.01), the model (120.00.00) includes Extractor procedure (120.01.02) to break down the flow of textual content to Facts (120.01.03.01), Concepts (120.01.03.02), Rules (120.01.03.03), Procedures (120.01.03.04), Principles (120.01.03.05) and Problem-Solving (120.01.03.06).

The next part that the model includes is strategies (120.02.00.00)—how to transform information to knowledge by the most effective method:

Real Time Learning Content strategy (120.02.01) provides opportunity to generate in real time learning, any content requested by the student, until the student is satisfied or has enough content.

Transformation of textual information to interactive learning content (120.02.02) is presented by text processing procedures that will extract data from text and deliver this data to the interactive learning template.

Usually learning content has information density higher than any other content. Next strategy (120.02.03) presents transformation through reduction of data. This strategy is describes as heuristic procedure that can measure information in each sentence as new (unknown) information or known information. So each sentence will have a number, called information density, which estimates how much new information is in this sentence. All sentences will be sorted by this number to make text reductions.

From the understanding of an information point of view, the information, transferred by the text, assumes presence at the reader of any primary knowledge, addressing to which, the author of text designs semantic meaning of text. Accordingly, by way of a maintenance to distinguish a theme (that is in advance known to participants of the communications) and rheme (new information that the author of the text adds in a theme). The author of the text provides mention of a theme in the heading, and the text devotes itself to various rhemes. In some text the focus is on an unenlightened audience whereby the theme provides some detail. Only by a Reading or a learning approach; with a focus on creating parts of text, with enough information on the theme, will the reader be able to provide the knowledge that is missing from the theme to understanding the text.

Structured Text Extractions: (keywords, summary, main characters, etc.) (120.02.04). This strategy has two aspects: 1.—adaptation to reader understanding process and 2.—attention catcher. Both aspects are implemented by highlighting different words in a text. By these extractions the reader will build an image of the maintenance of a separate fragment of the text, keeping an image of the text as the whole. This process is arranged similarly to understanding of the text by the person. In other words, repeated understanding of the several first fragments of the text is built and then the assumption of the possible complete maintenance is done. After that the maintenance is completed by the analysis of each followed fragment and the completed maintenance influences the already constructed images of the first fragments.

Text Complexity estimation (120.02.05) presents strategy based on a calculations of three complexity coefficients: dictionary level, grammar and style complexity, theme-rheme structural coefficient.

Third part of the model presents Tactics (120.03.00) as set of scenarios where described strategies were implemented. It includes:

Interactive Reading scenario (120.03.01),

Multi-sensory and multi-module templates (120.03.02),

Skim, Scan, Study scenarios (120.03.03),

Game Templates and Edutainment (120.03.04).

Figure 16:
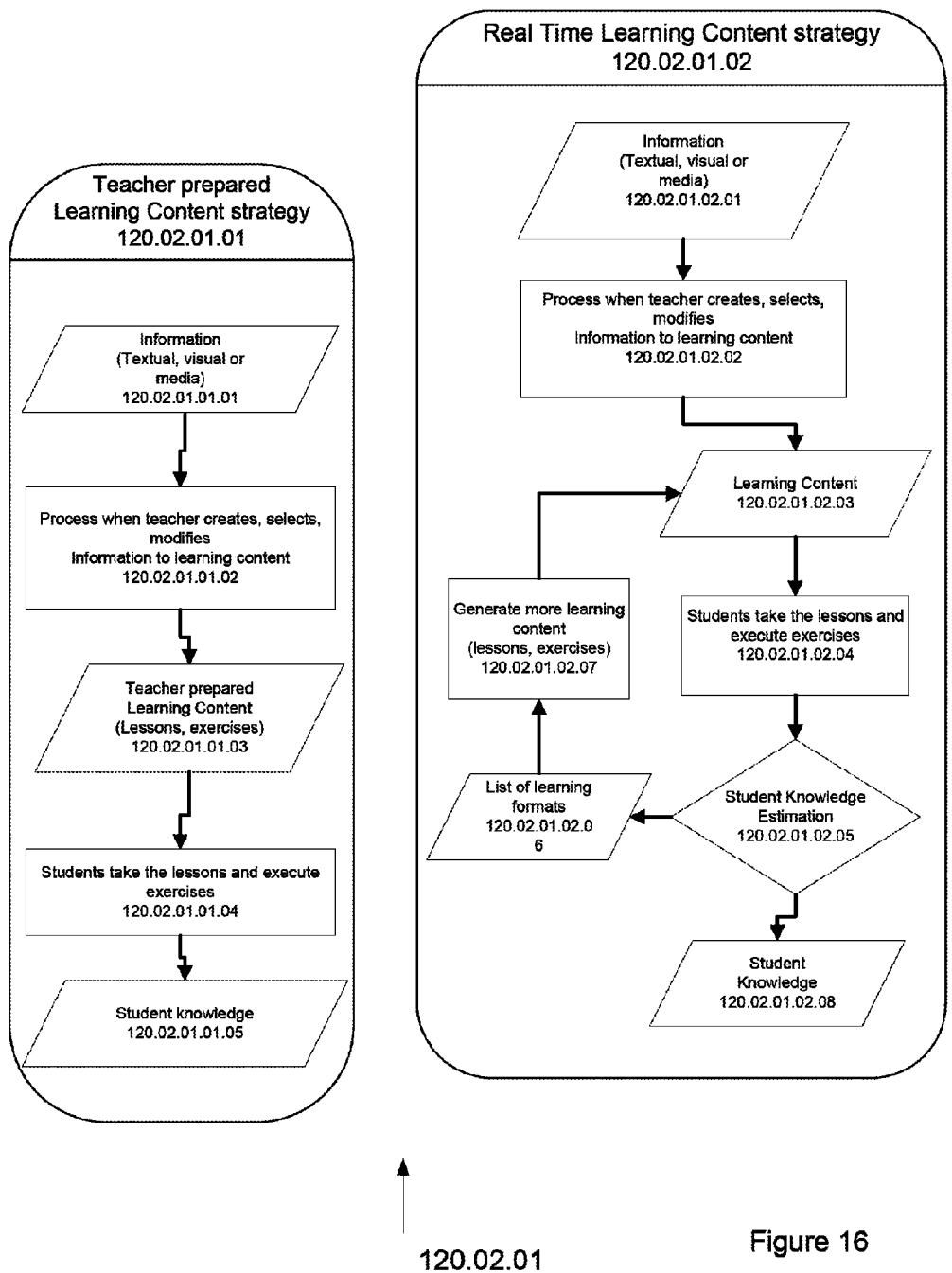
FIG. 16 is a flow chart illustrating the steps taken according to the Real time learning content strategy procedure of FIG. 15.

Real Time Learning Content Strategy (120.02.01) FIG. 16

Real Time Learning Content Strategy (120.02.01) contains two parts: Teacher prepared learning content strategy (120.02.01.01) and Real Time Content Strategy (120.02.01.02).

First approach describes a procedure how a teacher prepares learning content. A source of this approach is information (120.02.01.01.01) in different formats as text, picture, sound, other Medias, which is received from different places as books, internet pages, movies, other lessons, etc.

Process of learning content creation (120.02.01.01.02) is analysis and synthesis of information, where a teacher should write, read, select, collect, classify, systematic, modify, etc. This process should be finished before a student will start learning. The information selected to be learning content, will be formatted (120.02.01.01.03) in learning templates according to requirements or trademarks. As a result of this process teacher will have lessons and exercises that are equipped by timing and scoring parameters. Prepared lessons can be used (120.02.01.01.04) by students to learn. After applying teacher's lessons student should get knowledge (120.02.01.01.05).

In this strategy the process of content creation and process of using this learning content are separated by time. Any student will have the same lessons that are not depended on their personal priorities, features and skills.

The second strategy (120.02.01.02) presents an approach on how to provide real time learning content before and during student learning content.

A source (120.02.01.02.01) for real time learning content can be any electronic formatted document as digitized book (may be PDF format), internet pages, pictures, movie clips and databases with lessons and exercises.

Next step (120.02.01.02.02) is when a teacher prepares selected content as an exercise for a student's consumption which in now provided by (120.02.01.01.02) with a click of a button thereby automatically generating exercises by the system (113) within 10 seconds for a students consumption without having to spend minutes or hours of the teacher's time to create these student exercises.

When Learning Content (120.02.01.0.203) will be ready, process of learning (120.02.01.02.04) can be started. Next step (120.02.01.02.05) presents estimations that will be made allowed organizing loop and go to prepare more new learning content in real time. The estimations could be done by exercise scoring or testing mechanism or by student desire. If request to generate more exercises was made, student or teacher has possibilities to select (120.02.01.02.06) that learning format or templates which corresponded better to this particularly learning content or learning goal. Block (120.02.01.02.07) will generate more learning formats and template extractions based on information from block (120.02.01.02.08) in real time. These extractions create numerous opportunities for student to have many lessons and exercises that they may want or need to learn to get better scores. Block (120.02.01.02.05) presents student knowledge that will provide a looping process of generating as many exercises as student really needs to gain the confidence that they know or to obtain an acceptable mark.

Figure 17:
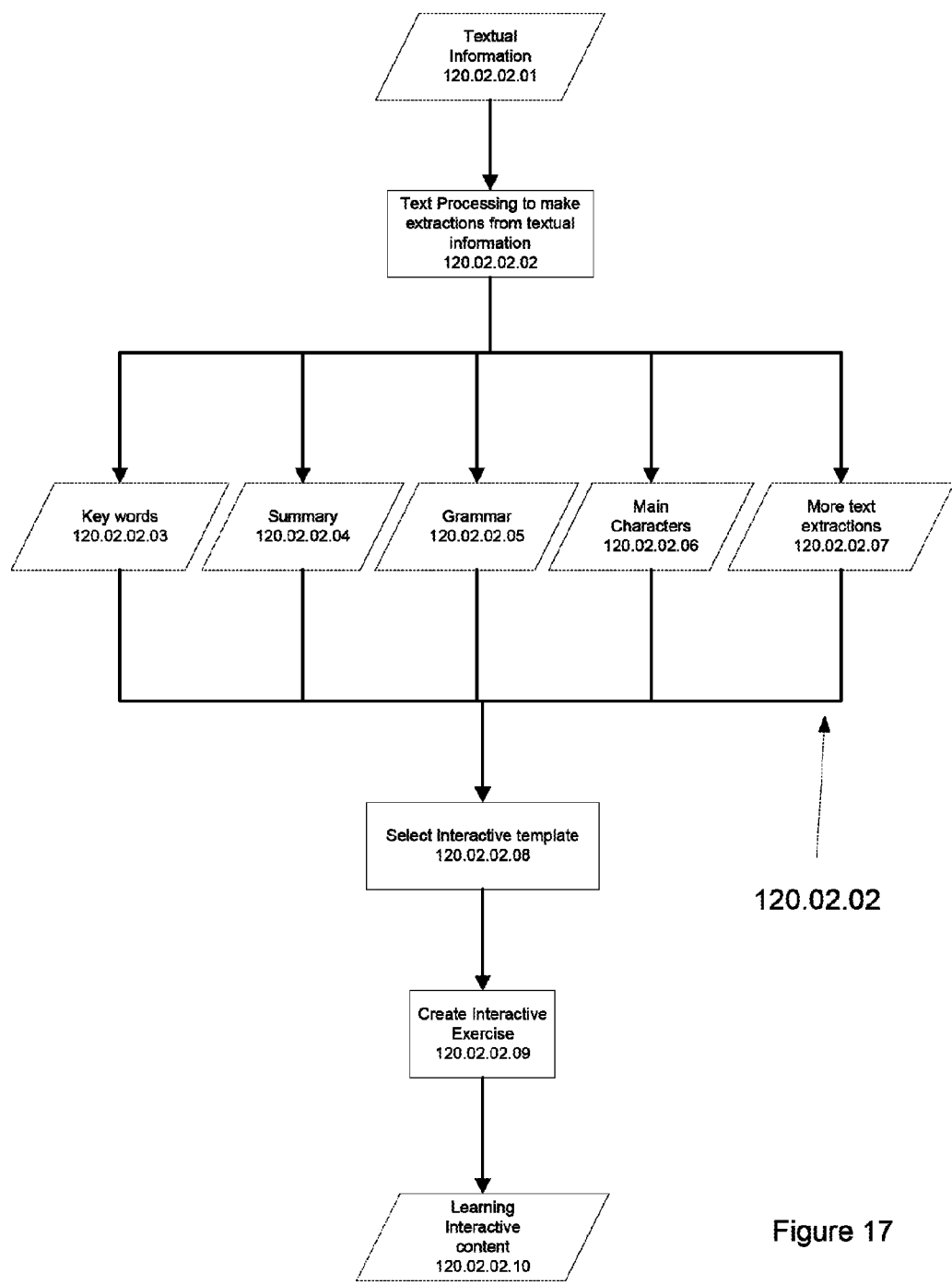
FIG. 17 is a flow chart illustrating the steps taken according to the Transformation of information to interactive content procedure of FIG. 15.

Transformation of Information into Interactive Content (120.02.02) FIG. 17

This strategy deals with situations when students have to read and learn content, data or textual information (120.02.02.01). If a student has to read a plain text the efficiency of this process could be estimated by efficiencies of reading techniques (normal reading, speed reading) that would be applied.

If we will add different behavior for communications with plain text, we will get interactive learning content. Therefore, Interactive learning content=Text extractions+behavior.

The main goal to this transformation is to build attention or concentration catchers that will bring more efficiency to the learning process.

To transform plain text to interactive content will begin from text processing procedures (120.02.02.02). The more extractions that the system can do from the text the more interaction templates can be created. The extractions can be presented as keywords (120.02.02.03), summary (120.02.02.04), grammar constructions (120.02.02.06) and others (120.02.02.07). Next step (120.02.02.08) includes a selection of interactive templates. These templates can be as:

A plain text with highlights of different words. These words can be keywords, different parts of speech, subjects and predicates, unknown words for student, etc. This format will provide concentration on the words which are the most important in the current context.

A test with multiple choice answers. Here each question is presented as one sentence from the text with missed keywords. This format will engage student's attention to provide more concentration for each sentence.

Mind webbing format. It allowed for eliminating differences between two processes: how to understand something and how to write about this.

Games format. It again can be attention or concentration catcher.

Next block (120.02.02.09) includes procedures that can transform plain and text extractions to selected learning format so learning interactive content (120.02.02.10) will be made much easier and faster.

Variations of the above described learning system modules and blocks, structures and components will be apparent to those skilled in the art and such variations are considered to be within the scope of the present invention. Thus modifications and alterations can be used in the learning system of the present invention without departing from the scope of the invention.

APPENDIX 1

System Aspects

1. Real time content. The embodiments are directed to methods and apparatus of a system that provides opportunities to learn any subject or language, which is presented by Real time digitized content to be learned. Learning efficiency in this case will be raised substantially since the user can increase their motivation scores. It is mostly important for learning of a textual subject and especially a language as second language, where a user needs a new language to improve their education or to acquire a new specialty. This new language can be in a subject field such as medicine, engineering, hospitality, hair design, etc.

2. Online generated exercises. Another aspect of the embodiments is presented by real time generated exercises to provide opportunity to learn language or a subject by not only the content presented by the teacher for a student to learn, but by user's favorite topic of text, news paper articles, fictions, user guide for modern technical device, traffics rules or instructions "How to use . . . ". It means a user will learn language grammar, new words, idioms, rhymes, synonyms, etc. and a user will learn new subject by reading comprehension, writing, note talking, mind webbing, games, etc. Such kind of apparatus allows improvements not only in knowledge but in personal skills too.

3. Advanced Learning Technologies. Another aspect of the embodiments is presented by generated exercises that contain different media environments for implementation, including competition formats, visual material and graphics, game formats, karaoke formats, etc.

"Thus, it can be argued that play in humans is a tool leading to perceptual, conceptual, intellectual and language development, the basic building blocks required for the formulation of higher cognitive functions."

Any learning process cannot exist separately. It is part of life. Humans spend a lot of time in their life to learn some thing new. An efficiency of this process defines important things as life success, health, etc.

4. Personal Action Success Strategy. Another aspect of the embodiments is presented by a Life Management system and PASS (personal action success strategy) that provides functions of the learning process as planning the personal scheduler, personalization of real time learning content, remote learning by multimodal presentation layer, including wireless devices and MP3/iPODs.

APPENDIX 2

Implementation of the model that represent exercise functionality

1. Learning Content
   1. Real time Learning Content
   2. Scheduled Real time Learning Content
   3. Structures Learning Content
2. Subjects
   1. Language Learning Subjects
      Grammar,
      Reading, reading comprehension and writing
      Listening and pronunciation
      Vocabulary
      Language skills
   2. Natural Subjects
      Geography, biology, physics, . . .
   3. Industrial Subjects
      Industrial specialties knowledge
   4. Others
3. Category
   1. multiple choices template,
   2. binary choices,
   3. visual choices,
   4. filling forms,
   5. selection forms,
   6. action and logical games,
   7. matching patterns,
   8. finding rules,
   9. puzzles, 10. quizzes,
11. chances and guessing,
12. process simulation,
13. analysis and synthesis,
14. explorer format,
15. discovery environment,
16. art studio,
17. text editor,
18. explorer, etc.
4. Learning Technologies
   1. Learning Forms,
   2. Syntality exercises that includes many different memory techniques,
   3. Note Taking approach,
   4. Mind Webbing,
   5. Multi-Sensory Learning,
   6. Speed Learning,
7. Multi Modal Learning Environment
5. Education Mode
   1. Information presentation mode,
   2. Explanation mode,
   3. Teachings raining mode,
   4. Knowledge testing mode
6. Output creations
   1. Answers to questions,
   2. Art, graphics, pictures,
   3. Collections, compositions, associations,
   4. Text, essay, notes,
   5. Reports, marks,
7. Implementation
   1. Server components;
   2. HTML tag,
   3. Browser object,
   4. User control
   5. Flash movie,
   6. Media component,
   7. Entire application,
   8. Message,

APPENDIX 3

Abbreviations

CDS—Content Description Structure,
UROS—User Request Description Structure,
EDS—Exercise description structure,
SCORM—Sharable Content Object Reference Model, standard for Content Management System,
CD—Content descriptor,
UD—User descriptor;

APPENDIX 4

Glossary

1. Syntality—is a collection of memory techniques, which uses different kind of associations for memorization of data. It is defined as, "Accelerated learning by actively doing!" Research has shown that when a person, "Reads, Hears, Sees, Says and Does (Interact) then they will be able to remember up to 90% of the information presented." Consequently, Syntality attempts to engage all of the Users six (6) senses through mnemonics, associations, memory pegs, music, sounds, visuals, summarizations, etc. to help them to turn information (data) presented into knowledge that they need to learn.

2. Sharable Content Object Reference Model (SCORM™) is a collection of standards and specifications for web-based e-learning. It defines how client side content and a host system catted the Run-time Environment may communicate with each other, as well as how content may be packaged into a transferable ZIP file. SCORM 2004 introduces a complex idea called sequencing—rules that specify the order a learner may experience content objects in. The standard uses XML and it is based on the results of work done by AICC, IMS, IEEE, and Ariadne.

3. Real Time Self-Learning (RTSL) Content. "An application in which data is received and immediately processed for knowledge consumption". It is any information which can be requested to transform to educational learning content online. This information can be presented by text files, HTML pages, etc.

4. Personal Action Success Strategy (PASS). It is a measured approach to provide effective ways to get desirable skills to achieve personal goals. It includes procedures to organize and use such information as: daily/weekly activity goals; Goal planning sheet; your plans of action; master dream list; accomplishments sheet; aids to visualization; long-range goals sheet; etc.

5. Scheduled User Content. It is that learning content which user used to create scheduler of lessons. It means, if user create lessons scheduler to learn some content then this content will be called scheduled.

6. Structured Content. It is any content that will be transformed into exercises, lessons or courses that has been pre-organized.

7. Time management system. It is a way of tracking appointments and things to do that have been organized into minutes per daily activity and hours per year goals, against a stated life span, that monitors interactive information to knowledge outputs.

8. Goal setting system. It is system that operates with the content that the user has obtained to interact with is called "goals". Operations are create, add, update, remove, add Property, estimate achievement or progress, etc.

9. Motivation system. It is system that provides directions for making decisions and self development. This system use as input data from goal system.

10. Score estimation system. It is a system that can measure, registry and keep or save numbers that describe result of process, which is called "score".

11. Performance Tracking System. It is a system to launch computer processes according to a scheduler. The systems responsibilities are to start and to end processes in define time and register all events when they appear between the beginning and ending of the process.

12. Multimodal learning environment. It is an environment that includes many different devices that will be used in the learning process. Such devices are computer, messaging systems, wireless phones, karaoke machines, smart small devices, players, etc.

13. An exabyte is a billion gigabytes, or $10^{18}$ bytes.

What I claim is:

1. A computer-implemented system for generating learning exercises and an improved learning method operating in real time in respect of an input stream of textual material, comprising:
   (a) a real time content processing block including:
      i. an input data module operable upon a user learning content request to receive content and separate textual parts of said content into an input data set, ii. dictionaries of linguistic patterns comprising computer based rules for linguistic patterns analysis,
iii. a content processing module adapted to:
A. extract and maintain sets of linguistic identification links in said input data set based upon said dictionaries of linguistic patterns and,
B. combine said input data set and said linguistic identification links into a different data set, wherein said different dataset provides text meaning, grammar and keywords;
(b) a user life management block including:
i. a life management processing module in communication with:
A. user object data module,
B. user personal database,
ii. a Personal Action Success Strategy ("PASS") module in communication with:
A. a user life management database,
B. said life management processing module, and
C. a learning reminder module,
wherein said PASS module comprises:
a. a time management system for creating personal scheduler,
b. a goal setting system, for creating new goals or modify existing goals, and
c. a performance tracking system,
(c) a system management block providing communication between parts of the system including a learning management module operable upon said user real time learning content request to:
i. retrieve said different data set and generate a request to said user life management block to return relevant user information,
ii. combine said relevant user information with said different data set,
iii. extract an unlearned data set from said input data set
iv. determine a user level,
v. provide an exercise response based upon said different data set, said unlearned data set, said relevant user information and said user level,
(d) an exercise generation block configured to generate and provide exercises in real time, the exercise generation block including:
i. an exercise generator module in communication with a real time learning modeling, said exercise generator operating upon:
A. said exercise response,
B. one or more of:
a data set of dictionaries,
a data set of picture dictionaries,
a media library,
a music library, and
C. a data set of exercise types and functions,
(e) a graphics user interface module operable to automatically present textual content as an exercise and collect user responses.

2. The computer-implemented system for generating learning exercises and an improved learning method as claimed in claim 1, wherein said dictionaries of linguistic patterns include a sentence extractor, a marquee summarizer, a syntactic parser, a semantic parser and a grammar extractor.

3. The computer-implemented system for generating learning exercises and an improved learning method as claimed in claim 2, wherein said linguistic identification links include sets of syntactic links, semantic schemes, grammar rules and key word structures.

4. The computer-implemented system for generating learning exercises and an improved learning method as claimed in claim 1, wherein said user life management block updates said user personal data set with said exercises and said responses.

5. The computer-implemented system for generating learning exercises and an improved learning method as claimed in claim 1, wherein said user life management block updates said user personal data set with summaries of said exercises and said responses.

6. The computer-implemented system for generating learning exercises and an improved learning method as claimed in claim 1, wherein said exercise generator module invokes a parametrical model of exercise functionality comprising the steps of:
(a) selecting a subject;
(b) selecting a category;
(c) selecting a learning technology;
(d) defining the education mode;
(e) generating input data for exercises;
(f) generating functionality for exercises;
(g) describing output of exercises; and
(h) selecting implementation components.

7. A non-transitory computer-readable medium embodying a computer program which, when executed by a computer, causes the computer to generate learning exercises and an improved learning method to carry out the functions of:
(a) real time textual content processing including:
i. processing input data operable upon a user learning content request to receive content and separate textual parts of said content into an input data set,
ii. obtaining dictionaries of linguistic patterns comprising computer based rules for linguistic patterns analysis,
iii. processing textual content adapted to:
A. extract and maintain sets of linguistic identification links in said input data set based upon said dictionaries of linguistic patterns, and,
B. combine said input data set and said linguistic identification links into a different data set, wherein said different dataset provides text meaning, grammar and keywords,
iv. communicating said different data set,
(b) user life management information processing including:
i. a life management processing module in communication with:
A. user object data module,
B. user personal database,
ii. a Personal Action Success Strategy ("PASS") module in communication with:
A. a user life management database,
B. said life management processing module, and
C. a learning reminder module,
wherein said PASS module comprises:
a. a time management system for creating personal scheduler,
b. a goal setting system, for creating new goals or modify existing goals, and
c. a performance tracking system,
(c) system management providing communication between parts of the system including a learning management module operable upon said user real time learning content request to:
i. retrieve said different data set and generate a request to said user life management information processing to return relevant user information, ii. combine said relevant user information with said different data set,
iii. extract an unlearned data set from said input data set.
iv. determine a user level,
v. to provide an exercise response based upon said different data set, said unlearned data set, said relevant user information and said user level,
(d) exercise generation including:
   i. an exercise generator module in communication with a real time learning modeling, said exercise generator operating upon:
     A. said exercise response, and
     B. one or more of:
       a data set of dictionaries
       a data set of picture dictionaries
       a media library
       a music library
     C. a data set of exercise types and functions,
(e) generation and providing user exercises in real time,
(f) a graphics user interface module operable to automatically present textual content as an exercise and collect user responses.

8. The non-transitory computer-readable medium as claimed in claim 7 which, when executed by the computer, causes the computer to carry out the function of returning user results to said life management processing module.

\* \* \* \* \*